US012634643B2

(12) United States Patent
Borra et al.

(10) Patent No.: US 12,634,643 B2
(45) Date of Patent: May 19, 2026

(54) SWAPPABLE RECHARGEABLE BATTERY CARTRIDGE FOR HEARING AID AND CHARGER SYSTEM

(71) Applicant: Starkey Laboratories, Inc., Eden Prairie, MN (US)

(72) Inventors: Ganesh Borra, Plymouth, MN (US); Nathan Alan Arachikavitz, Lakeland Shores, MN (US); Timothy M. Werts, St. Louis Park, MN (US); John Bradley Etherington, Eagan, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 204 days.

(21) Appl. No.: 18/236,808

(22) Filed: Aug. 22, 2023

(65) Prior Publication Data

US 2024/0080635 A1 Mar. 7, 2024

Related U.S. Application Data

(60) Provisional application No. 63/403,049, filed on Sep. 1, 2022.

(51) Int. Cl.
H04R 25/00 (2006.01)
H02J 50/00 (2016.01)
H02J 50/10 (2016.01)

(52) U.S. Cl.
CPC .......... H04R 25/602 (2013.01); H02J 50/005 (2020.01); H02J 50/10 (2016.02); H04R 25/30 (2013.01); *H04R 2225/31* (2013.01)

(58) Field of Classification Search
CPC .............. H01H 2300/004; H04R 25/00; H04R 2225/021; H01M 10/0422; H01M 50/682
See application file for complete search history.

(56) References Cited

U.S. PATENT DOCUMENTS 7,324,652 B2 * 1/2008 Preves .............. H01M 10/0445
381/323
10,341,788 B2 7/2019 Henriksen
(Continued)

FOREIGN PATENT DOCUMENTS

DE 1132201 6/1962
EP 3169084 5/2017
(Continued)

OTHER PUBLICATIONS

"Apple's AirPods Pro 2 new device exposed, adding heart rate detection, assistive listening/assistive listening functions!," posted on Guangdong Jun. 24, 2022, accessible at URL <https://mp.weixin.qq.com/s/j5hiH69iIQgd4xJxB5oYIQ> (10 pages).
(Continued)

*Primary Examiner* — Duc Nguyen
(74) *Attorney, Agent, or Firm* — Pauly, DeVries Smith & Deffner LLC

(57) ABSTRACT

Embodiments herein relate to ear-worn devices with swappable, rechargeable battery cartridges and charger cases for the ear-worn devices. In an embodiment, a hearing assistance system is included having a first ear-worn device can include a first cartridge having a rechargeable battery and a first cartridge charging structure, and a charger case can include a first case charging structure, where the first ear-worn device is configured to be positioned within the charger case so that the first cartridge charging structure of the first ear-worn device is adjacent to the first case charging structure within the charger case. The first cartridge is configured to be removed from the first ear-worn device and positioned within the charger case so that the first cartridge charging structure is adjacent to the first case charging structure within the charger case, without the ear-worn device being positioned in the charger case.

19 Claims, 16 Drawing Sheets

(56) References Cited

U.S. PATENT DOCUMENTS

| | | | | |
|---|---|---|---|---|
| 2010/0033839 A1* | 2/2010 | Fujisaki | ......... | G02B 15/144113 359/687 |
| 2010/0320961 A1* | 12/2010 | Castillo | ................... | H02J 7/342 320/108 |
| 2014/0259287 A1* | 9/2014 | Waters | ............... | A41D 13/0002 2/209 |
| 2018/0115055 A1* | 4/2018 | Hosadurga | ........... | H04R 25/554 |
| 2018/0373057 A1* | 12/2018 | Hino | ........................ | G02C 7/06 |
| 2019/0222944 A1* | 7/2019 | Jürg | ....................... | H04R 25/55 |
| 2020/0101312 A1* | 4/2020 | Pai | ....................... | A61N 5/0619 |
| 2020/0185968 A1* | 6/2020 | Kim | ........................ | H02J 50/12 |
| 2020/0275218 A1* | 8/2020 | Xue | ..................... | H04R 1/1025 |
| 2022/0109941 A1* | 4/2022 | Shriner | ............... | H04R 1/1016 |
| 2022/0352742 A1* | 11/2022 | Olson | ................... | H02J 7/0044 |
| 2022/0407150 A1* | 12/2022 | Davidson | .............. | H01M 50/51 |
| 2023/0275617 A1* | 8/2023 | Benton | ................. | G01R 33/07 381/59 |
| 2024/0097138 A1* | 3/2024 | Deng | .................... | H01M 4/366 |

FOREIGN PATENT DOCUMENTS

| | | |
|---|---|---|
| EP | 3364667 | 8/2018 |
| EP | 3573351 | 11/2019 |
| EP | 3869084 | 8/2021 |
| WO | 2010151225 | 12/2010 |

OTHER PUBLICATIONS

"Beltone MyPAL Micro," Beltone product information available at URL <https://shop.beltone.com/products/mypal-micro?variant= 32293371019367> at least as early as Jun. 28, 2022 (11 pages).
"FM ADA Kit 37," FM ADA Compliance Kit WilliamsSound Specification Data 2019 (6 pages).
"ReSound Micro Mic," ReSound Product information available at URL<https://www.resound.com/en-us/hearing-aids/accessories/micro-mic> at least as early as Oct. 10, 2017 (5 pages).
"Roger Table Mic II," Phonak Product User Guide available at URL <https://us.hearingdirect.com/products/phonak-roger-table-mic-ii-a-intelligent-wireless-microphone-transmitter?> 2017 (25 pages).
"StreamLine Mic," Signia product information available at URL <https://www.signia.net/en-us/chargers-and-accessories/streamline-mic/> at least as early as May 8, 2021 (21 pages).
"Williams Sound PocketTalker Ultra Duo w/Headphones, Earbud, & Free Year Supply of Batteries—PKTD1-EH," Liberty Health Supply Product listing available at URL<https://libertyhealthsupply.com/williams-sound-pocketalker-ultra-duo-w-headphones-earbud-free-year-supply-of-batteries-pktd1-eh/?cmp_id=902030156>at least as early as Jun. 28, 2022 (10 pages).
"Wireless Auditory Assistance Kit With Enviro-Mic," Comtek product available for sale at URL <https://www.maxiaids.com/wireless-auditory-assistance-kit-with-enviro-mic> at least as early as Aug. 5, 2020 (4 pages).

* cited by examiner

1600

REMOVING A CARTRIDGE SECURING
MECHANISM FROM AN EAR-WORN DEVICE — 1602

REMOVING A FIRST CARTRIDGE FROM THE
EAR-WORN DEVICE — 1604

POSITIONING THE FIRST CARTRIDGE WITHIN
A CHARGER CASE — 1606

PLACING A SECOND CARTRIDGE IN THE EAR-
WORN DEVICE — 1608

SECURING THE SECOND CARTRIDGE IN THE
EAR-WORN DEVICE WITH THE CARTRIDGE
SECURING MECHANISM — 1610

SWAPPABLE RECHARGEABLE BATTERY CARTRIDGE FOR HEARING AID AND CHARGER SYSTEM

This application claims the benefit of U.S. Provisional Application No. 63/403,049, filed Sep. 1, 2022, the content of which is incorporated herein by reference in its entirety.

FIELD

Embodiments herein relate to ear-worn devices and more particularly to ear-worn devices having rechargeable batteries.

BACKGROUND

Ear-worn devices are configured to provide audio input to the ears of a user. Some examples of hearing devices are headsets, hearing aids, speakers, cochlear implants, bone conduction devices, and personal listening devices. Hearing devices often include a rechargeable battery that can be recharged, but can become depleted during daily use, leaving the user without the benefit of a functioning hearing device.

SUMMARY

In a first aspect, a hearing assistance system can be included having a first ear-worn device can include a speaker, a microphone, a processor, a non-transitory computer memory. The first ear-worn device can include a first cartridge having a rechargeable battery and a first cartridge charging structure. The system can include a charger case which can include a first case charging structure, wherein the first ear-worn device can be configured to be positioned within the charger case so that the first cartridge charging structure of the first ear-worn device can be adjacent to the first case charging structure within the charger case. The first cartridge can be configured to be removed from the first ear-worn device and positioned within the charger case so that the first cartridge charging structure can be adjacent to the first case charging structure within the charger case.

In a second aspect, in addition to one or more of the preceding or following aspects, or in the alternative to some aspects, the first ear-worn device can include a cartridge securing mechanism, wherein the first cartridge can be removable from the first ear-worn device upon removal of the cartridge securing mechanism from the first ear-worn device.

In a third aspect, in addition to one or more of the preceding or following aspects, or in the alternative to some aspects, the system further can include a second cartridge, the second cartridge can include a second rechargeable battery and a second cartridge charging structure, wherein the second cartridge can be configured to replace the first cartridge in the first ear-worn device.

In a fourth aspect, in addition to one or more of the preceding or following aspects, or in the alternative to some aspects, the first cartridge can include a power management module.

In a fifth aspect, in addition to one or more of the preceding or following aspects, or in the alternative to some aspects, the first cartridge can include a cartridge housing defining a cartridge housing perimeter, wherein the first ear-worn device includes a cartridge opening having a cartridge opening perimeter configured to receive the first cartridge and mate with the cartridge housing perimeter upon the first cartridge being positioned in the first ear-worn device. The cartridge housing can include an outer panel. The outer panel can include an outer surface of the first cartridge, an inner surface, and the cartridge housing perimeter. The cartridge housing can further include a battery shroud attached to the inner surface of the outer panel and extending around portions of the rechargeable battery. The battery shroud can include a top battery shroud perimeter.

In a sixth aspect, in addition to one or more of the preceding or following aspects, or in the alternative to some aspects, the first cartridge can include a first cartridge lap joint flange surrounding the outer panel perimeter and a second cartridge lap joint flange surrounding the battery shroud perimeter.

In a seventh aspect, in addition to one or more of the preceding or following aspects, or in the alternative to some aspects, the first cartridge lap joint flange can be configured to interface with a first ear-worn device lap joint flange on an ear-worn device housing to form a first lap joint, and the second cartridge lap joint flange can be configured to interface with a second ear-worn device lap joint flange on an ear-worn device spine to form a second lap joint.

In an eighth aspect, in addition to one or more of the preceding or following aspects, or in the alternative to some aspects, the battery shroud can be configured to completely cover the rechargeable battery such that the rechargeable battery can be encased by the cartridge housing and the battery shroud.

In a ninth aspect, in addition to one or more of the preceding or following aspects, or in the alternative to some aspects, the first cartridge charging structure includes a cartridge charging contact pair and the first case charging structure includes a case charging contact pair, wherein the first cartridge can be configured to be positioned within the charger case so that the first cartridge charging contact pair can be in electrical communication with the first case charging contact pair within the charger case.

In a tenth aspect, in addition to one or more of the preceding or following aspects, or in the alternative to some aspects, the first cartridge can include a cartridge alignment mechanism and the charger case can include a charger case alignment mechanism, wherein the cartridge alignment mechanism can be configured to align the first cartridge charging contact pair to the first case charging contact pair within the charger case.

In an eleventh aspect, in addition to one or more of the preceding or following aspects, or in the alternative to some aspects, the cartridge alignment mechanism and the case alignment mechanism include magnets.

In a twelfth aspect, in addition to one or more of the preceding or following aspects, or in the alternative to some aspects, the first cartridge charging structure includes a cartridge inductive charging coil and the first case charging structure includes a case inductive charging coil, wherein the first cartridge can be configured to be positioned within the charger case so that the first cartridge inductive charging coil can be adjacent to the first case inductive charging coil within the charger case.

In a thirteenth aspect, in addition to one or more of the preceding or following aspects, or in the alternative to some aspects, the first cartridge can be configured to be removably positioned within a cavity of the first ear-worn device.

In a fourteenth aspect, in addition to one or more of the preceding or following aspects, or in the alternative to some aspects, the first cartridge can include a cartridge connector and the first ear-worn device can include an ear-worn device connector disposed within the cavity, wherein the cartridge connector can be configured to removably connect to the ear-worn device connector within the cavity.

In a fifteenth aspect, in addition to one or more of the preceding or following aspects, or in the alternative to some aspects, the cartridge connector and the ear-worn device connector can include one of the group consisting of a pin and socket connector, a spring-loaded pin connector, and a spring contact connector.

In a sixteenth aspect, in addition to one or more of the preceding or following aspects, or in the alternative to some aspects, further can include hydrophobic coating covering the rechargeable battery.

In a seventeenth aspect, in addition to one or more of the preceding or following aspects, or in the alternative to some aspects, the rechargeable battery can be welded to a plurality of battery tabs in the first cartridge.

In an eighteenth aspect, in addition to one or more of the preceding or following aspects, or in the alternative to some aspects, the rechargeable battery can be removable from the first cartridge and configured to be replaced with a second rechargeable battery.

In a nineteenth aspect, a hearing assistance system can be included having a first ear-worn device. The first ear-worn device can include, a speaker, a microphone, a processor, a non-transitory computer memory, and a first cartridge. The first cartridge can have a first rechargeable battery, a first cartridge charging structure, and a first power management module.

In a twentieth aspect, in addition to one or more of the preceding or following aspects, or in the alternative to some aspects, further can include a charger case that includes a first case charging structure, wherein the first ear-worn device can be configured to be positioned within the charger case so that the first cartridge charging structure of the first ear-worn device can be adjacent to the first case charging structure within the charger case, wherein the first cartridge can be configured to be removed from the first ear-worn device and positioned within the charger case so that the first cartridge charging structure can be adjacent to the first case charging structure within the charger case.

In a twenty-first aspect, in addition to one or more of the preceding or following aspects, or in the alternative to some aspects, further can include a second cartridge that can include a second rechargeable battery, a second cartridge charging structure, and second power management module, wherein the second cartridge can be configured to replace the first cartridge in the first ear-worn device, and wherein the second cartridge can be configured to be removed from the first ear-worn device and positioned within the charger case so that the second cartridge charging structure can be adjacent to the first case charging structure within the charger case.

In a twenty-second aspect, in addition to one or more of the preceding or following aspects, or in the alternative to some aspects, the charger case includes a case magnetic alignment structure, the first cartridge further includes a first magnetic alignment structure, and wherein the case magnetic alignment structure pulls the first cartridge into a charging orientation in the charger case.

In a twenty-third aspect, a method of replacing a rechargeable battery in a hearing assistance system, can be included, the method including removing a cartridge securing mechanism from an ear-worn device and removing a first cartridge from the ear-worn device, where the first cartridge can include a rechargeable battery and a first cartridge charging structure. The method can further include positioning the first cartridge within a charger case such that the first cartridge charging structure can be adjacent to a first case charging structure within the charger case, placing a second cartridge in the ear-worn device, and securing the second cartridge in the ear-worn device with the cartridge securing mechanism.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings and will be described in detail. It should be understood, however, that the scope herein is not limited to the particular aspects

DETAILED DESCRIPTION

Rechargeable batteries offer cost and resource saving benefits over single use batteries. One major drawback of using rechargeable batteries in ear-worn devices is the risk that the battery charge will not last over a period of time when the user is away from or unable to use a charging device, such as a multi-day trip to a location without electricity or a period of time while traveling. Conversely, ear-worn devices with disposable batteries enable the user to swap out dead batteries. The present disclosure aims to combine the cost and resource savings of rechargeable batteries with the convenience of disposable batteries for ear-worn device users by providing a hearing assistance system with an ear-worn device having a swappable rechargeable battery cartridge.

The hearing assistance system can include an ear-worn device configured to removably receive a first battery cartridge, also referred to as a first cartridge. The first cartridge can have a rechargeable battery configured to supply power to the electrical components of the ear-worn device. When the rechargeable battery of the first cartridge is depleted, the first cartridge can be removed from the ear-worn device and replaced with a second cartridge. The second cartridge can have a fully charged rechargeable battery configured to supply power to the electrical components of the ear-worn device. The depleted first cartridge can be placed in a charger case of the hearing assistance system to recharge the rechargeable battery. In this scenario, the first cartridge can be placed in the charger case without the remainder of the ear-worn device. Alternatively, the first cartridge can remain inserted in the ear-worn device and the entire ear-worn device can be placed in the charger case to recharge the rechargeable battery. The system provides flexibility to charge the entire ear-worn device or to charge just a swappable battery cartridge for use with the ear-worn device using the same charger case.

Figure 1:
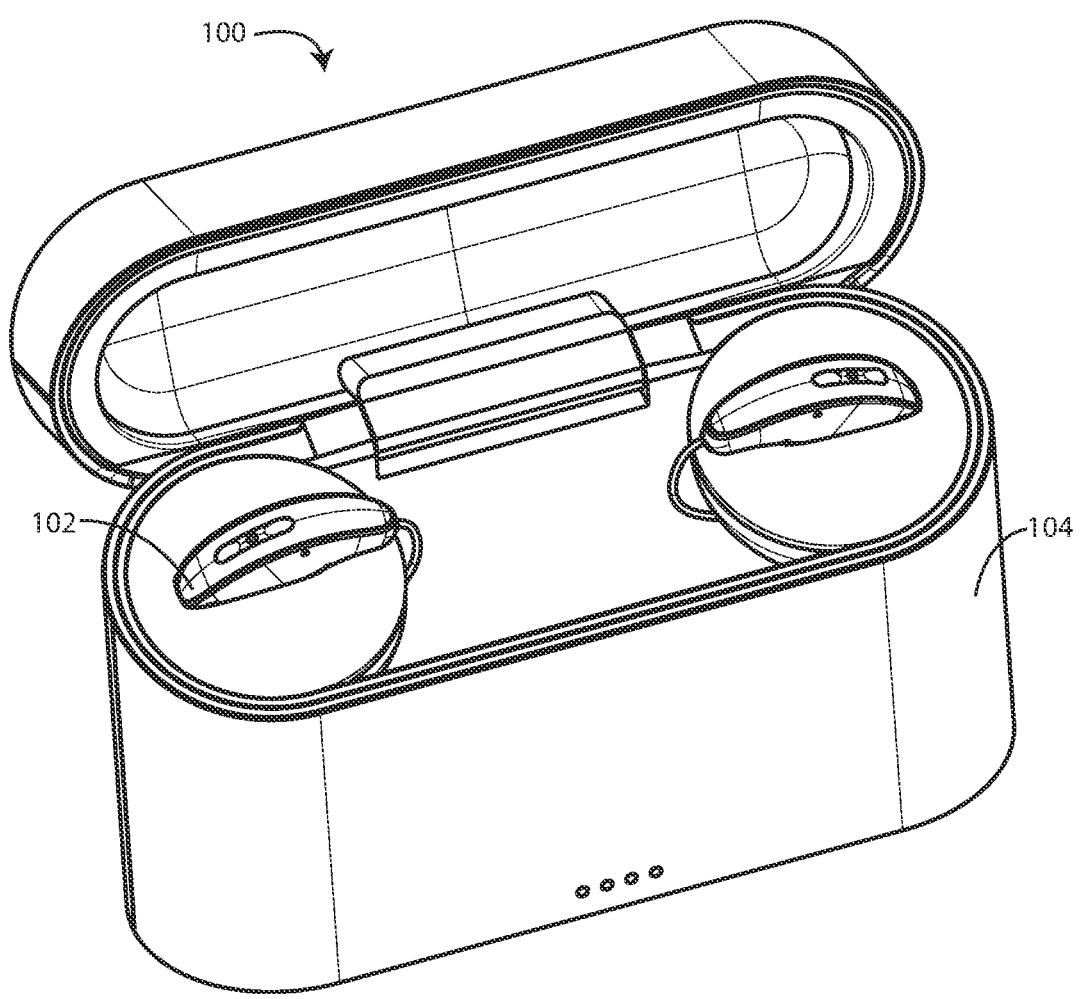
FIG. 1 is a perspective view of a hearing assistance system in accordance with various embodiments herein.

Referring now to FIG. 1, a perspective view of a hearing assistance system is shown in accordance with various embodiments herein. The hearing assistance system can include at least one ear-worn device 102 and a charger case 104. In various embodiments, each ear-worn device 102 contains a rechargeable battery and is configured to be positioned within the charger case so that a charging structure of the ear-worn device 102 sits adjacent a case charging structure within the charger case 104 such that the rechargeable battery can be recharged by the charging case.

In the example of FIG. 1, the hearing assistance system 100 includes two ear-worn devices 102. However, in some embodiments, the hearing assistance system 100 may include a single ear-worn device 102 and in some embodiments, the hearing assistance system 100 may include three or more ear-worn devices 102.

Ear-Worn Devices

The term "ear-worn device" as used herein shall refer to devices that can aid a person with impaired hearing. The term "ear-worn device" shall also refer to devices that can produce optimized or processed sound for persons with normal hearing. Hearing aid assemblies herein can include hearables (e.g., wearable earphones, headphones, earbuds, virtual reality headsets), hearing aids (e.g., hearing instruments), cochlear implants, and bone-conduction devices, for example. Hearing aid assemblies include, but are not limited to, behind-the-ear (BTE), in-the ear (ITE), in-the-canal (ITC), invisible-in-canal (IIC), receiver-in-canal (RIC), receiver in-the-ear (RITE) or completely-in-the-canal (CIC) type hearing aid assemblies or some combination of the above. In some embodiments, the hearing aid assemblies may comprise a contralateral routing of signal (CROS) or bilateral microphones with contralateral routing of signal (BiCROS) amplification system. In some embodiments herein, an ear-worn device may also take the form of a piece of jewelry, including the frames of glasses, which may be attached to the head on or about the ear. The structures and components described herein can also be used in an ear-wearable device that is not a hearing assistance device, such as a medical monitoring device.

Figure 2:
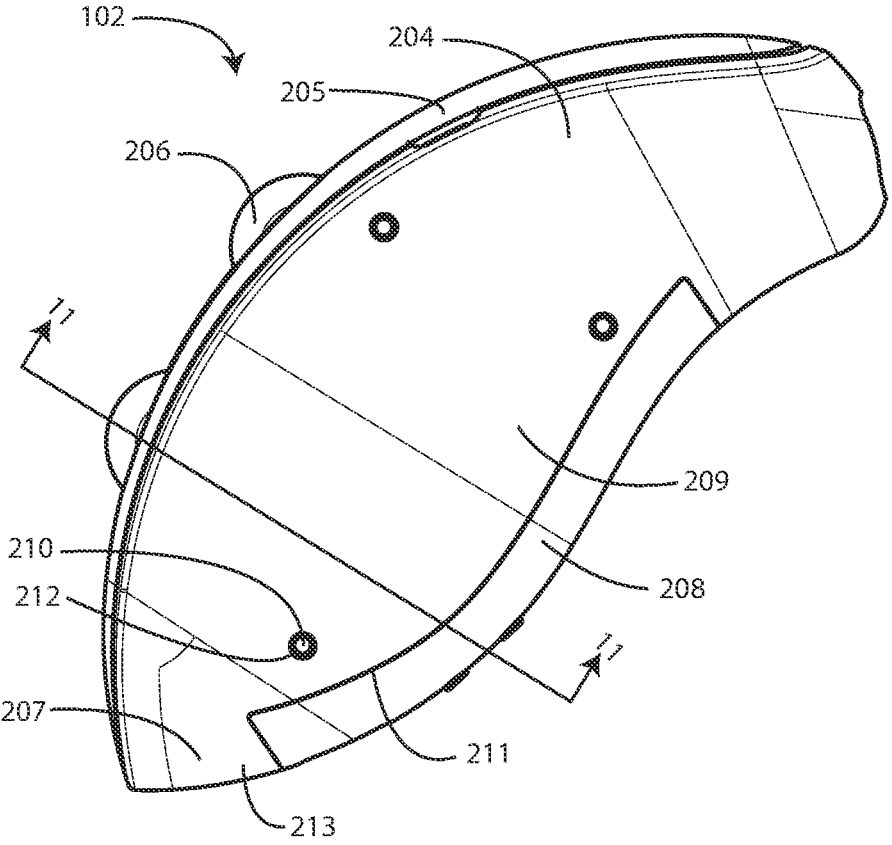
FIG. 2 is a perspective view of an ear-worn device in accordance with various embodiments herein.

Referring now to FIG. 2, a perspective view of an ear-worn device is shown in accordance with various embodiments herein. The ear-worn device 102 can include an ear-worn device housing 204. In various embodiments, the ear-worn device housing 204 is adapted to be worn on or behind an ear of a wearer. The ear-worn device housing 204 is configured rest against a user's outer ear in a behind-the-ear orientation. The ear-worn device housing 204 can be manufactured utilizing any suitable technique or techniques, e.g., injection-molding, 3D printing, etc. The housing 12 can include any suitable material or materials, e.g., silicone, urethane, acrylates, flexible epoxy, acrylated urethane, and combinations thereof. In various embodiments, the housing can be formed from a top case 205 and a bottom case 207. In some embodiments, the top case 205 is removably attached to the bottom case 207 by means of any of adhesive, a snap fit, press fit, a pin connection, or the like.

In various embodiments, the ear-worn device 102 can include user input device 206. In the example of FIG. 1, the user input device 206 is disposed on the top case 205 of the ear-worn device housing 204, but other placements are of the user input device are possible. In various embodiments, the user input device 206 can have include one or more buttons, switches, or the like, such as a first button and a second button. For example, a volume up button and a volume down button can be included in the user input device. In various embodiments the hearing aid user can interact with the user input device 206 (e.g., by pressing one or more buttons) to adjust the volume, change one or more settings, or turn the ear-worn device on or off.

In various embodiments, the ear-worn device housing 204 can define a cartridge opening 209 forming cavity. In various embodiments, the cartridge opening 209 is formed within a wall of the bottom case 207. The cartridge opening 209 can be shaped to hold a cartridge 208. The ear-worn device housing 204 may contain one or more electronic components, which will be described in further detail herein. The electronic components can be disposed in any suitable location or arrangement within the ear-worn device housing 204 and can receive power form a rechargeable battery housed in the cartridge 208.

The ear-worn device 102 can have a cartridge securing mechanism 210 configured to secure the cartridge 208 within the ear-worn device 102. In various embodiments, the cartridge 208 cannot be removed from the ear-worn device 102 when the cartridge securing mechanism 210 is in place. The cartridge 208 can be removed from the ear-worn device 102 after cartridge securing mechanism 210 has been removed from the ear-worn device 102. In various embodiments, the cartridge securing mechanism 210 is configured to prevent the cartridge 208 from being inadvertently removed from the ear-worn device 102, such as in the event that the ear-worn device is dropped. The cartridge securing mechanism 210 can be any suitable mechanism or mechanisms including, but not limited to any combination of cross pins, lap joints, adhesives, a snap fit structure, a press fit structure, or the like. In the embodiment of FIG. 2, the cartridge securing mechanism 210 includes two cross pins 212, with each having a first end that is visible in FIG. 2. The cross pins 212 may extend through the ear-worn device 102 and have a first end secured in a first side of the ear-worn device and a second end secured in a second end of the ear-worn device. This creates a compressive force between the two sides of the ear-worn device 102 and holds secures the cartridge 208 between the two sides. The cross pins may further thread through one or more apertures in the cartridge 208, preventing movement of the cartridge relative to the ear-worn device 102.

Figure 3:
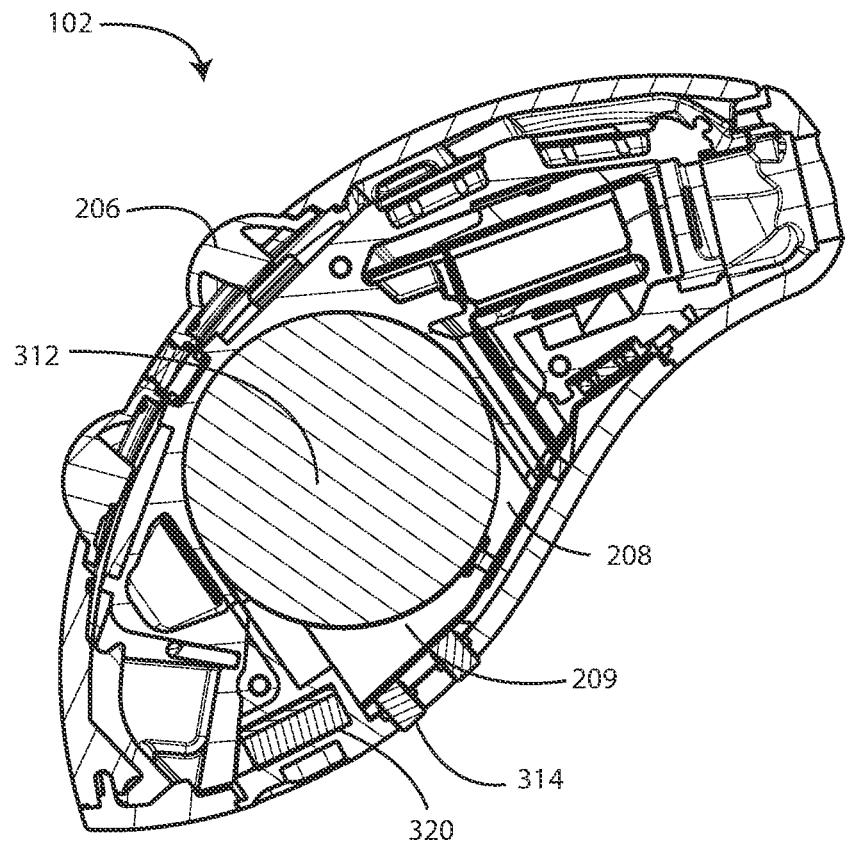
FIG. 3 is a cross-sectional view of the ear-worn device of FIG. 2 in accordance with various embodiments herein.

Referring now to FIG. 3, a cross-sectional view of the ear-worn device of FIG. 2 is shown in accordance with various embodiments herein. In various embodiments, the ear-worn device 102 can include a cartridge 208 disposed within a cartridge opening 209 of the ear-worn device housing 204 such that an outer surface of the cartridge sits flush with the ear-worn device housing 204 when the cartridge is inserted into the ear-worn device. The cartridge can contain a battery configured to supply power to the electrical components of the ear-worn device 102.

In various embodiments, the battery is a rechargeable battery 312. The battery can be any suitable type of rechargeable battery including, but not limited to NiCd (Nickel-Cadmium), NiMH (Nickel-Metal Hydride), Li-ion (Lithium Ion), or the like. The cartridge 208 can include a cartridge charging structure 314 configured to allow the rechargeable battery 312 to receive power from a charger case 104 when the cartridge 208 positioned within the charger case such that the cartridge charging structure 314 is adjacent to a case charging structure within the charger case. Cartridges Referring now to FIG. 4, a perspective view of a cartridge is shown in accordance with various embodiments herein. In various embodiments, the cartridge 208 can include a cartridge housing 416. The cartridge housing 416 defines a cartridge housing perimeter 211 and an outer panel 417. The cartridge housing perimeter 211 is the boundary between the cartridge housing 416 and the ear-worn device housing on an outer surface 213 of the ear-worn device housing 204. The outer panel can have an outer surface 419 and an inner surface 421. In various embodiments, the outer surface 419 of the outer panel 417 of the cartridge housing 416 is configured to sit flush with the outer surface of the ear-worn device housing 204 (FIG. 2), when the cartridge 208 is installed in the cartridge opening 209 of the ear-worn device 102.

The cartridge 208 can further include a charging assembly 420. The charging assembly can be disposed on the inner surface 421 of the cartridge housing 416 and can contain one or more electrical components housed on a suitable circuit board, such as flexible circuit board, which will be described in greater detail herein.

In some embodiments, the cartridge 208 can further include a magnet 320 configured to mate with magnet within the charger case 104. In this embodiment, the magnet 320 and a magnet of the charger case cause the cartridge to snap into an aligned position for charging the battery of the cartridge 208. The magnet 320 can be positioned on a portion of the inner surface 421 of the outer panel 417 or can be embedded within the material of the outer panel 417.

Figure 4:
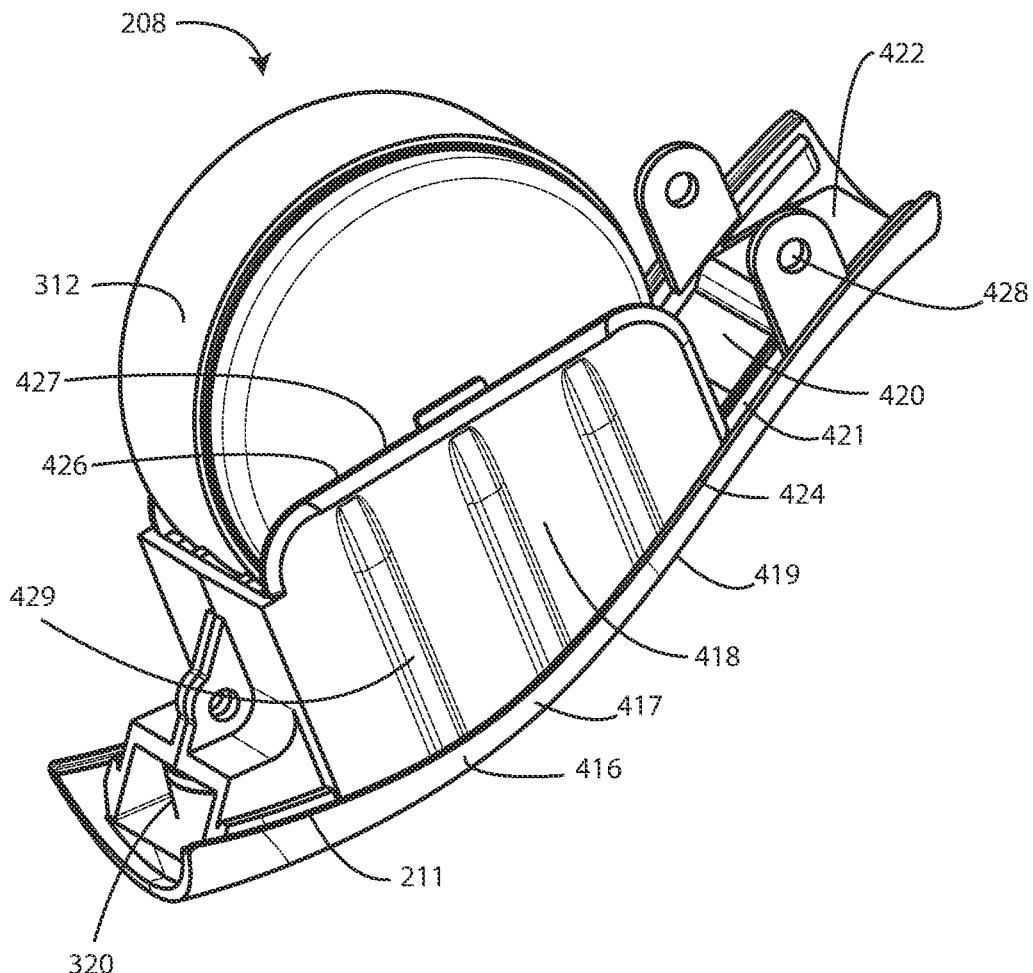
FIG. 4 is a perspective view of a cartridge in accordance with various embodiments herein.

The cartridge 208 can further include a rechargeable battery 312. The battery can be electrically connected to the charging assembly 420 and supported by a battery shroud 418. In various embodiments, the battery shroud 418 is attached to the inner surface 421 of the cartridge housing 416 and extends around portions of the rechargeable battery 312. In the example of FIG. 4, the rechargeable battery 312 is substantially cylindrical in shape and the battery shroud 418 extends around the front and rear circular faces and one of the sides of the rechargeable battery. Alternatively, the battery shroud may extend around all sides of the rechargeable battery 312 or just the front and rear faces. It should be noted that different shapes and sizes of rechargeable battery can be accommodated by the cartridge 208 and the shape and size of the battery shroud 418 can be adjusted to accommodate the dimensions of the rechargeable battery.

The battery shroud can include a top battery shroud perimeter 427. In the embodiment of FIG. 4, the battery shroud 418 extends from the inner surface 421 of the cartridge housing 416 to about half of the height of the rechargeable battery 312. In some embodiments, the battery shroud 418 may extend approximately 25%, 50%, 75%, or 100% of the height of the rechargeable battery 312. In some embodiments, the battery shroud 418 can extend along the entire height and cover the top of the rechargeable battery 312, such that rechargeable battery is fully encased by the cartridge housing 416 and the battery shroud 418. The battery shroud 418 can further include a plurality of ribs 429 configured to align the cartridge 208 to a spine of the ear-worn device 102.

The cartridge may further include one or more apertures 428, with each aperture sized to receive a cross pin 212 of ear-worn device 102. As described above, the ear-worn device may include one or more cross pins configured to extend through the ear-worn device 102 and have a first end secured to a first side of the ear-worn device and a second end secured to a second end of the ear-worn device. The cross pins may further thread through one or more apertures 428 in the cartridge 208, preventing movement of the cartridge relative to the ear-worn device 102.

Figure 5:
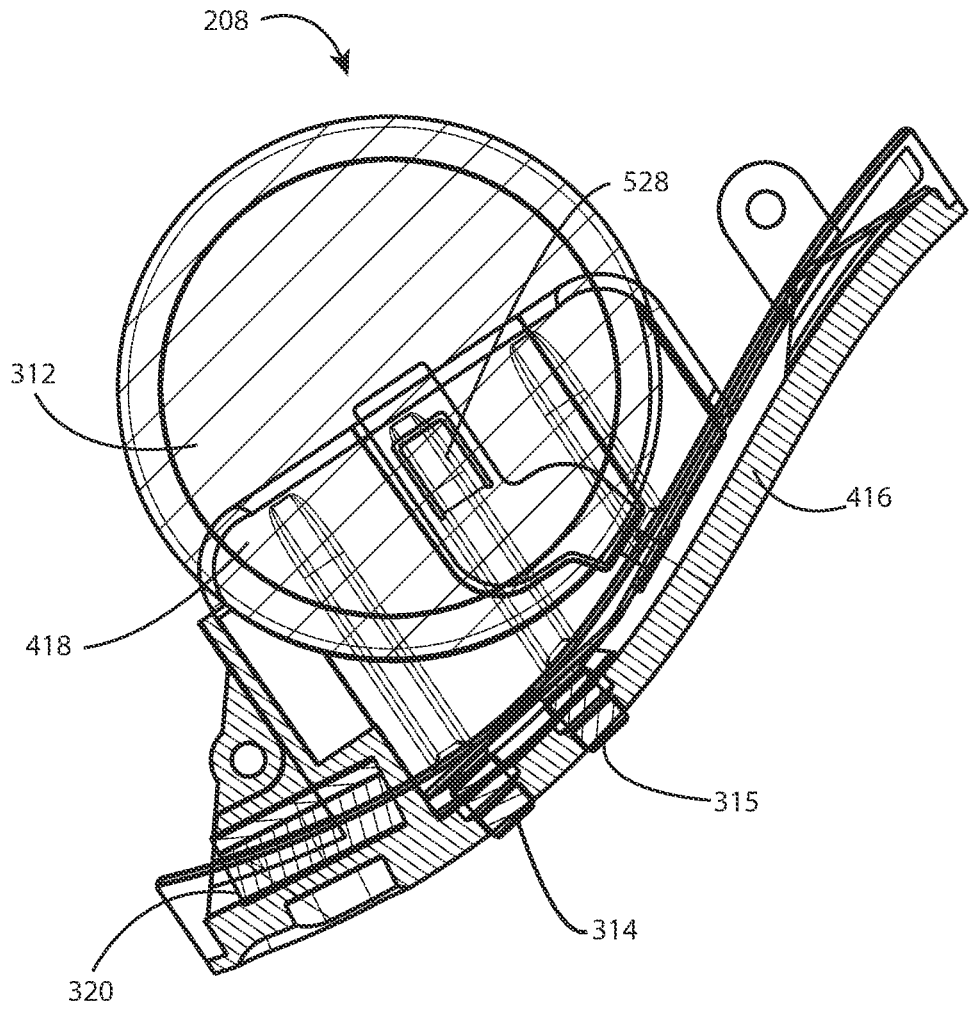
FIG. 5 is a cross-sectional view of the cartridge of FIG. 4, with a battery illustrated as transparent to reveal other components, in accordance with various embodiments herein.

Referring now to FIG. 5, a cross-sectional view of the cartridge of FIG. 4 is shown in accordance with various embodiments herein. In FIG. 5, the battery illustrated transparently so that the shroud behind the battery is visible. The cartridge 208 can further include one or more battery tabs 528. The battery tabs 528 can be electrically connected to the charging assembly 420 on a first end by any suitable means including, but not limited to welding, soldering, or the like. The battery tabs 528 can be connected to the rechargeable battery 312 at a second end, such that the rechargeable battery is electrically connected to the charging assembly 420 through the battery tabs. In some embodiments, the battery tabs 528 are permanently connected to the rechargeable battery 312. In an embodiment, the battery tabs 528 are soldered to the rechargeable battery 312. Alternatively, the battery tabs 528 are removably connected to the rechargeable battery 312 by a scratch connection or the like such that the battery tabs are frictionally engaged with the rechargeable battery, but not connected by any permanent means. Such a connection allows for the rechargeable battery 312 to be removed from the cartridge 208 and to be replaced with a different rechargeable battery by simply sliding the rechargeable battery 312 out from in between the battery tabs 528.

In various embodiments, the electronic components housed in the cartridge 208 are treated with one or more hydrophobic coatings. In an embodiment, the rechargeable battery 312 and the battery tabs 528 are coated with one or more hydrophobic coatings, such as a parylene coating, a nanocoating, or the like. In some embodiments, the portions of the rechargeable battery 312 to be soldered to the battery tabs 528 are not initially coated with the hydrophobic coating, but after the after soldering, the soldered connections between the rechargeable battery 312 and battery tabs 528 are coated with a hydrophobic barrier coating. While not intending to be bound by theory and not describing all situations, it is believed, that coating the rechargeable battery with a hydrophobic coating will reduce the occurrence of adverse events such as power surges resulting from an ingress of fluids in the ear worn device 102, thus extending the lifetime of the rechargeable battery 312 and other components of the ear-worn device.

Ear-Worn Device and Cartridge System

Figure 6:
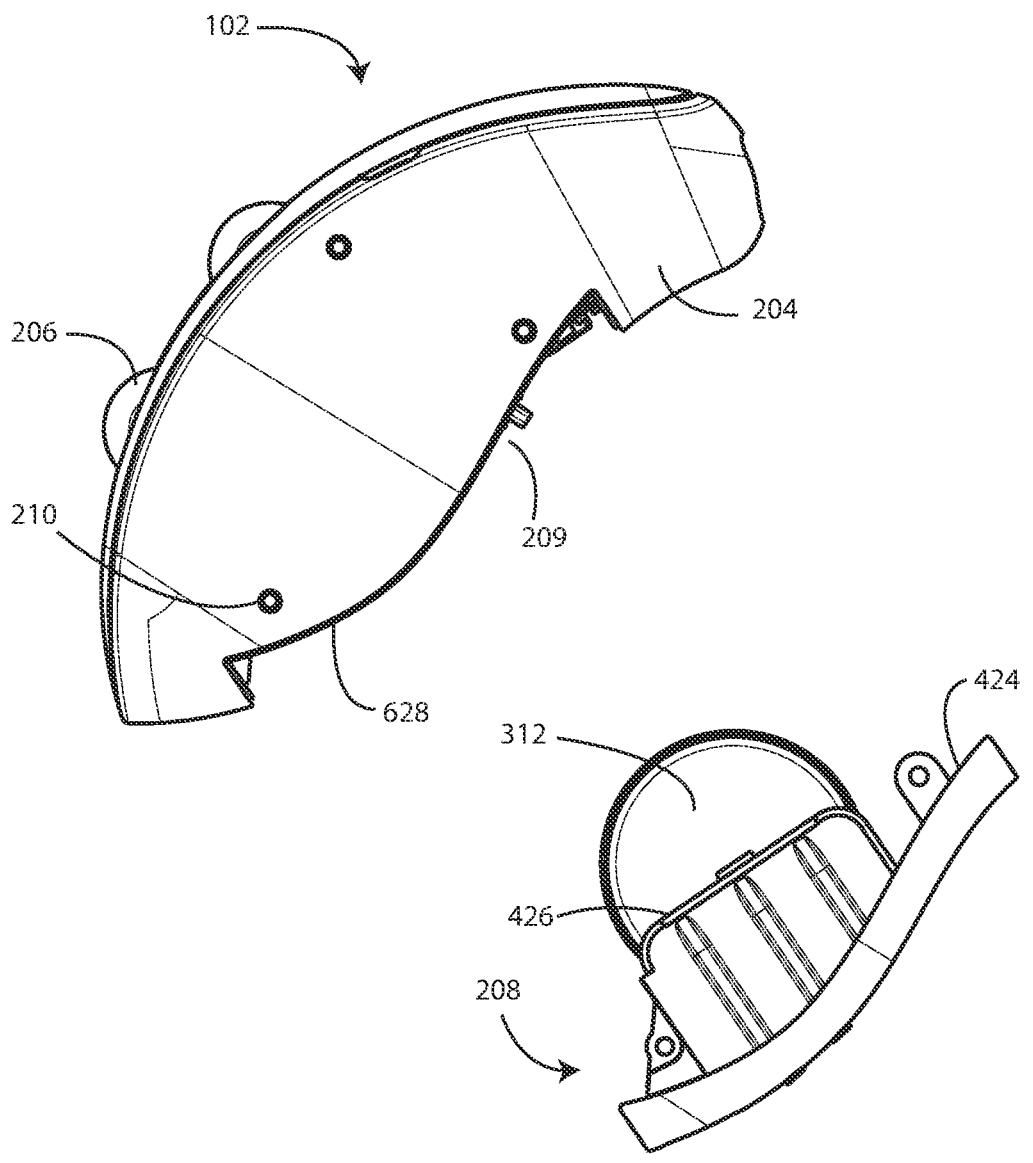
FIG. 6 is an exploded view of the ear-worn device of FIG. 2, in accordance with various embodiments herein.

Referring now to FIG. 6, an exploded view of the ear-worn device of FIG. 2 is shown in accordance with various embodiments herein. FIG. 6 depicts an ear-worn device 102 with the cartridge 208 removed exposing cartridge opening 209 within the ear-worn device housing 204. In various embodiments, the ear-worn device 102 can include a cartridge securing mechanism 210 and the cartridge 208 is removable from the ear-worn device 102 upon releasing cartridge securing mechanism 210 from the ear-worn device. In an embodiment, the cartridge 208 may be pulled out from the bottom of the ear-worn device housing 204. After being removed from the ear-worn device 102, the rechargeable battery 312 of cartridge 208 may be recharged by charger case 104 and the cartridge 208 may be placed back in the ear-worn device. Alternatively, the hearing assistance system 100 may also include a second cartridge, where the second cartridge is substantially identical to the original cartridge and is configured to replace the original cartridge in the ear-worn device 102.

Having redundant cartridges is especially advantageous when the rechargeable battery of the original cartridge becomes depleted. A user can replace the depleted original cartridge with a second cartridge having a fully charged or partially charged rechargeable battery. This prevents the ear-worn device user from having to wait for the depleted battery in the first cartridge to recharge before resuming use of the ear-worn device. The hearing assistance system 100 can include any number of cartridges 208 configured to fit within cartridge opening 209 and having a rechargeable battery configured to supply power to an ear-worn device 102. In some embodiments, the number of cartridges 208 included in the hearing assistance system 100 can be greater than or equal to 1, 2, 3, 4, or 5 cartridges.

Figure 7:
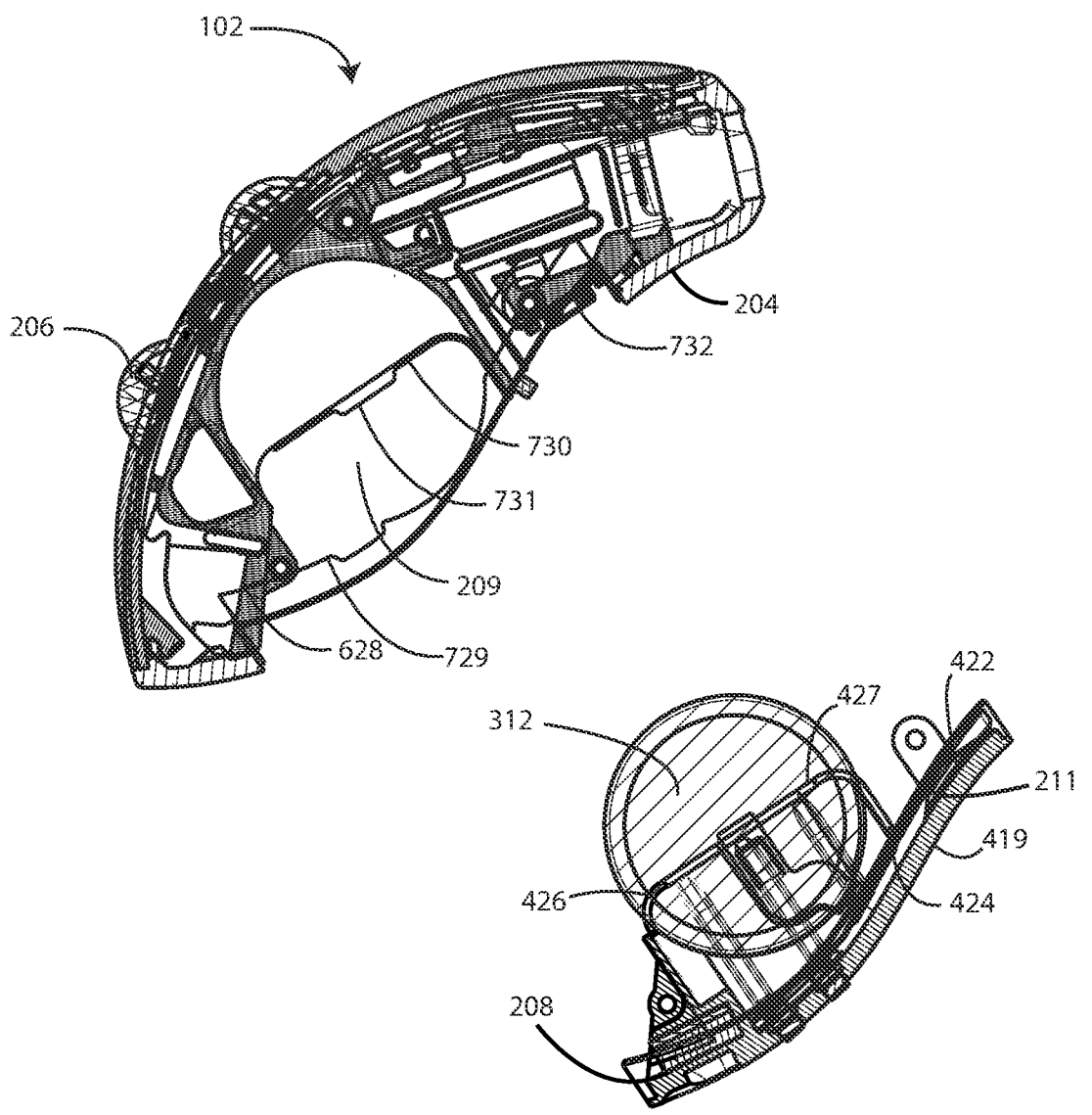
FIG. 7 is a cross-sectional view of the ear-worn device of FIG. 6, with battery illustrated as transparent, in accordance with various embodiments herein.

Referring now to FIG. 7, a cross-sectional view of the ear-worn device of FIG. 6 is shown in accordance with various embodiments herein. In various embodiments, the cartridge 208 can have a cartridge housing 416 that defines a cartridge housing perimeter 211 and the ear-worn device 102 can have a cartridge opening 209 having a cartridge opening perimeter 729. In various embodiments, the cartridge opening perimeter 729 is configured to receive a first cartridge 208 and mate with the cartridge housing perimeter 211 upon the first cartridge being positioned in the ear-worn device 102.

In various embodiments, the first cartridge can further include a first cartridge lap joint flange 424 surrounding the cartridge housing perimeter 211 and the ear-worn device 102 can further include a first ear-worn device lap joint flange 628 surrounding the cartridge opening perimeter 729 on the ear-worn device housing 204. In an embodiment, the first cartridge lap joint flange 424 is configured to interface with a first ear-worn device lap joint flange 628 on an ear-worn device housing 204 to form a first lap joint.

In various embodiments, the cartridge housing 416 includes an outer panel 417 having an outer surface 419 and an inner surface 421 and a battery shroud 418 attached to the inner surface 421 of the outer panel 417. The battery shroud 418 can form a top battery shroud perimeter 427. The ear-worn device 102 can have an ear-worn device spine 730. In various embodiments, an outer perimeter of the ear-worn device spine 730 is configured to mate with the top battery shroud perimeter 427 upon the first cartridge being positioned in the ear-worn device 102. In various embodiments, the ear-worn device spine 730 is a group or subassembly of components within the ear-worn device housing 204 including components such as a circuit board, a speaker, and a microphone.

In various embodiments, the cartridge can include a second cartridge lap joint flange 426 surrounding the battery shroud perimeter 427 and the ear-worn device spine 730 can include a second ear-worn device lap joint flange 731. In an embodiment, the second cartridge lap joint flange 426 is configured to interface with a second ear-worn device lap joint flange 731 on an ear-worn device spine 730 to form a second lap joint.

In various embodiments, the cartridge 208 is configured to form a seal with the ear-worn device 102 through a combination of lap joints and/or cartridge securing mechanisms. In example of FIGS. 6-7, the cartridge 208 is configured form a seal with the ear-worn device 102 using a combination the first lap joint formed from the first cartridge lap joint flange 424 and the first ear-worn device lap joint flange 628, the second lap joint formed from the second cartridge lap joint flange 426 and the second ear-worn device lap joint flange 731, and the cartridge securing mechanism 210. The combination of the first lap joint and the second lap results in the rechargeable battery being encased by the cartridge housing 416, the ear-worn device housing 204, and the ear-worn device spine 730, thus sealing the rechargeable battery 312 away from the ambient environment. While not intending to be bound by theory and not describing all situations, it is believed, that the seal formed from the lap joints in combination with the cartridge securing mechanism isolates the internal components of the ear-worn device 102 and cartridge 208 from the external environment protecting them from the ingress of water and other contaminants. This reduces the occurrence of adverse events, such as power surges and, thus increasing the lifespan of the ear ear-worn device and its internal electrical components.

Charging Assembly

Figure 8:
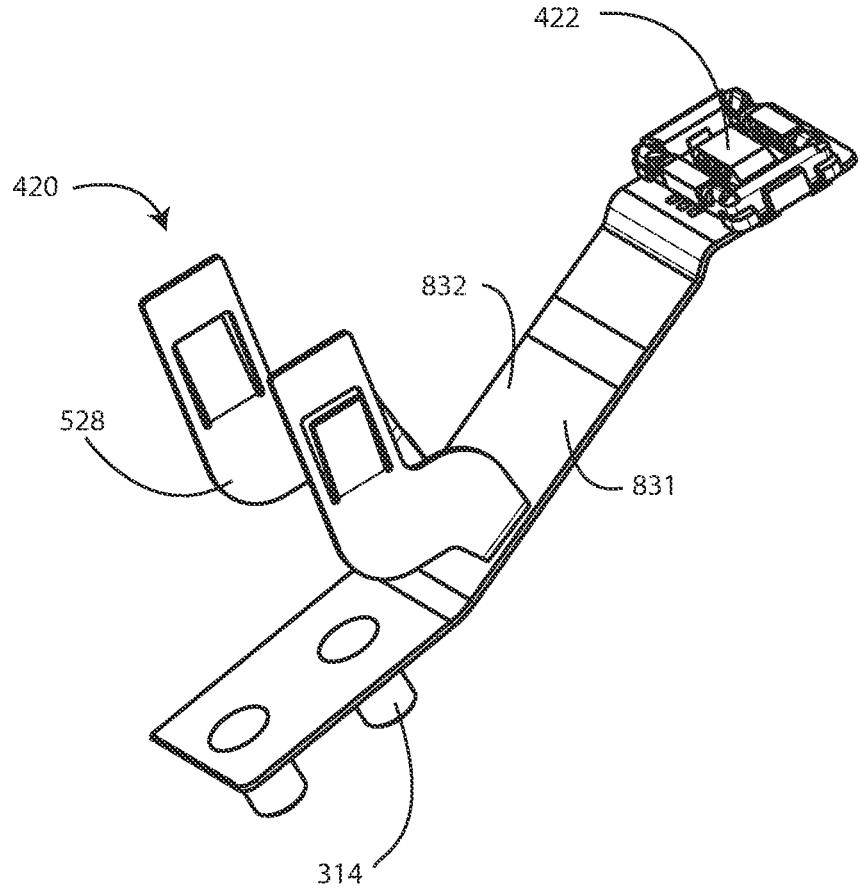
FIG. 8 is a perspective view of a charging assembly in accordance with various embodiments herein.

Referring now to FIG. 8, a perspective view of a charging assembly is shown in accordance with various embodiments herein. In various embodiments, charging assembly 420 is configured to sit on the inner surface 421 of the cartridge housing 416. In various embodiments, battery tabs 528 are joined to the charging assembly 420 by means of soldering or the like. The charging assembly 420 can further include a cartridge connector 422 and one or more electronic components housed on a flexible circuit board 831, such as power management module 832.

A power management module 832 as defined herein is a power distribution, load monitor, and protection device configured to protect an electrical circuit from damage caused by an overload condition or short circuit. The power management module 832 is configured to detect a fault condition (i.e., a power surge from an ingress of fluid) and interrupt current flow to the circuit. The power management module 832 can include one or both of a power management integrated circuit (PMIC) and a protection circuit module (PCM). A PMIC as defined herein can refer to an integrated circuit having multiple power rails and power management functions within a single chip such as different power converters, power controls and battery protection functions. A PCM can include the same battery protection functions though may not necessarily be implemented on a single chip.

In various embodiments, the power management module 832 is located on and electrically connected to a flexible circuit board 831 of the cartridge, rather than located on and electrically connected to a main circuit board of the ear-worn device 102. Such a configuration offers several advantages. Placing the power management module 832 in the cartridge 208 enables the cartridge to be placed in a charger case 104 to charge the rechargeable battery 312 either in combination with an ear-worn device 102 or as a stand-alone cartridge. Furthermore, while not intending to be bound by theory and not describing all situations, it is believed, having a power management module 832 close to the rechargeable battery 312 on the flexible circuit board 831 increases the ability of the power management interrupt current flow to the circuit in the event of a power surge or other adverse event, resulting in improved performance and lifetime of the rechargeable battery 312 and other electrical components housed on the flexible circuit board.

Figure 9:
FIG. 9 is a top view of the charging assembly of FIG. 8 in accordance with various embodiments herein.
Figure 9:
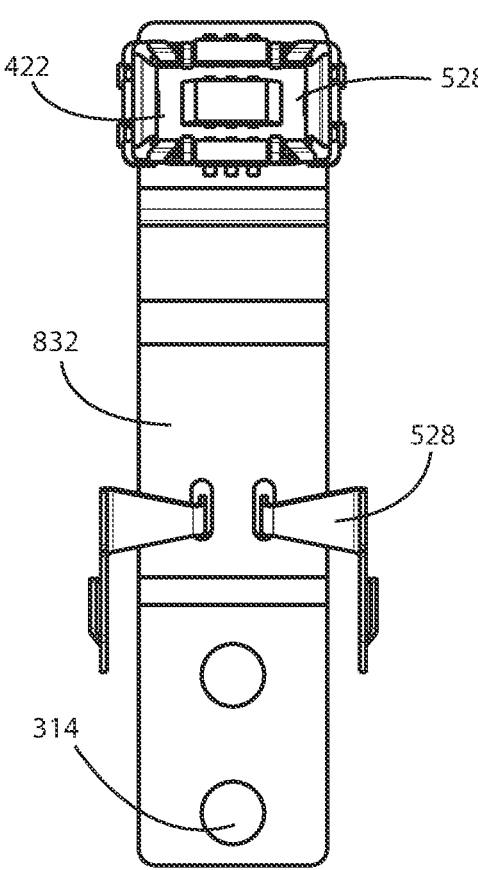

Referring now to FIG. 9, a top view of the charging assembly of FIG. 8 is shown in accordance with various embodiments herein. In various embodiments, the cartridge 208 can include a cartridge connector 422 and the ear-worn device 102 can include an ear-worn device connector 732 disposed within the cartridge opening 209. In an embodiment, the cartridge connector 422 is configured to removably connect to the ear-worn device connector 722 within the cartridge opening 209 of the ear-worn device. In various embodiments, the connection between the cartridge connector 422 and ear-worn device connector 722 is configured to electrically connect the cartridge 208 to the ear-worn device 102 such that the rechargeable battery 312 of the cartridge can supply power to the electrical components of the ear-worn device 102. In various embodiments, the cartridge connector and the ear-worn device connector can be any suitable type or types of electrical connector including, but not limited to a pin and socket connector, a spring-loaded pin connector, and a spring contact connector.

Figure 10:
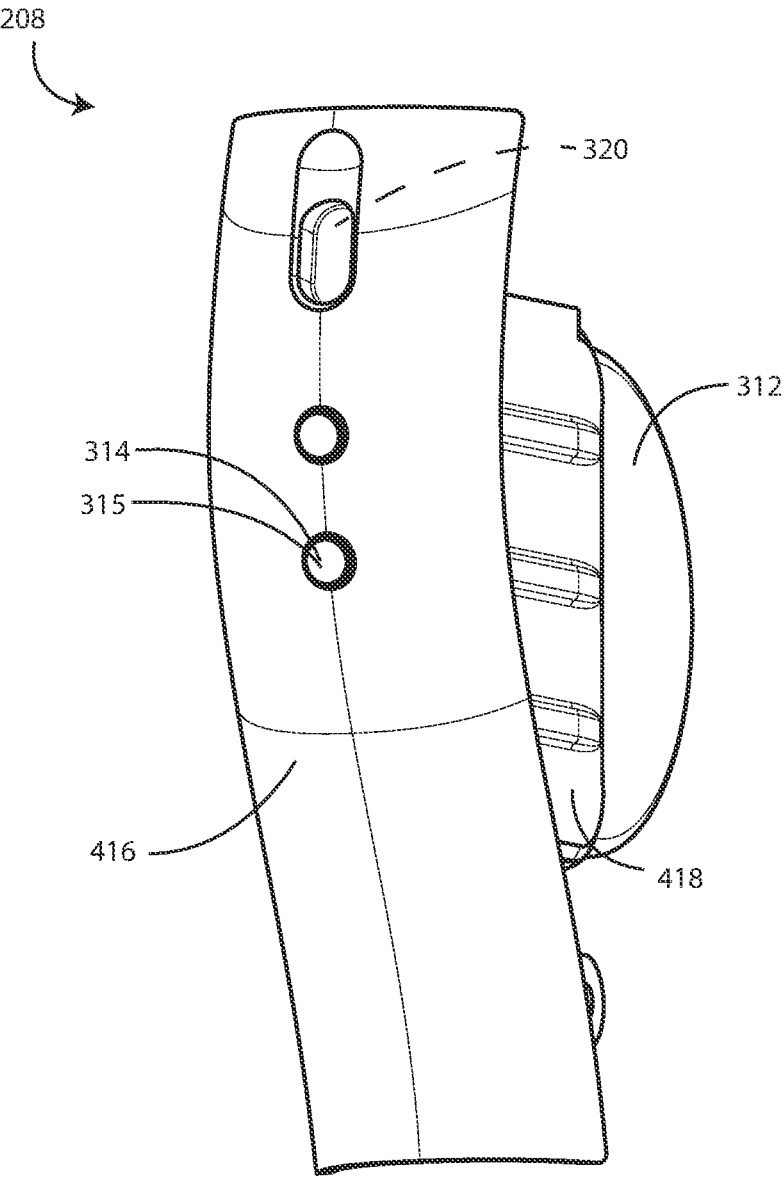
FIG. 10 is a bottom perspective view of a cartridge in accordance with various embodiments herein.

Referring now to FIG. 10, a bottom perspective view of a cartridge is shown in accordance with various embodiments herein. In various embodiments, the cartridge 208 can include a cartridge charging structure 314. In some embodiments, the cartridge charging structure 314 can be a conductive charging structure, such that the rechargeable battery 312 is charged through direct physical and electrical contact with a charging structure of the charger case 104. The cartridge charging structure 314 can include a cartridge charging contact pair and the charger case 104 can have a case charging contact pair such that the cartridge 208 is configured to be positioned within the charger case 104 so that the first cartridge charging contact pair is in electrical communication with the first case charging contact pair within the charger case. This example is depicted by FIGS. 3, 5, 7, and 10, each showing cartridge charging contact pair 315. Other charging structure configurations are possible and are described below.

In some embodiments, the cartridge charging structure 314 can be an inductive charging structure such that the rechargeable battery 312 is charged by being placed in proximity to a charging structure of the charger case 104. The cartridge charging structure 314 can include a cartridge inductive charging coil and the charger case 104 can have a case inductive charging coil, such that the cartridge 208 is configured to be positioned within the charger case 104 so that the first cartridge inductive charging coil is adjacent to the first case inductive charging coil within the charger case.

Figure 11:
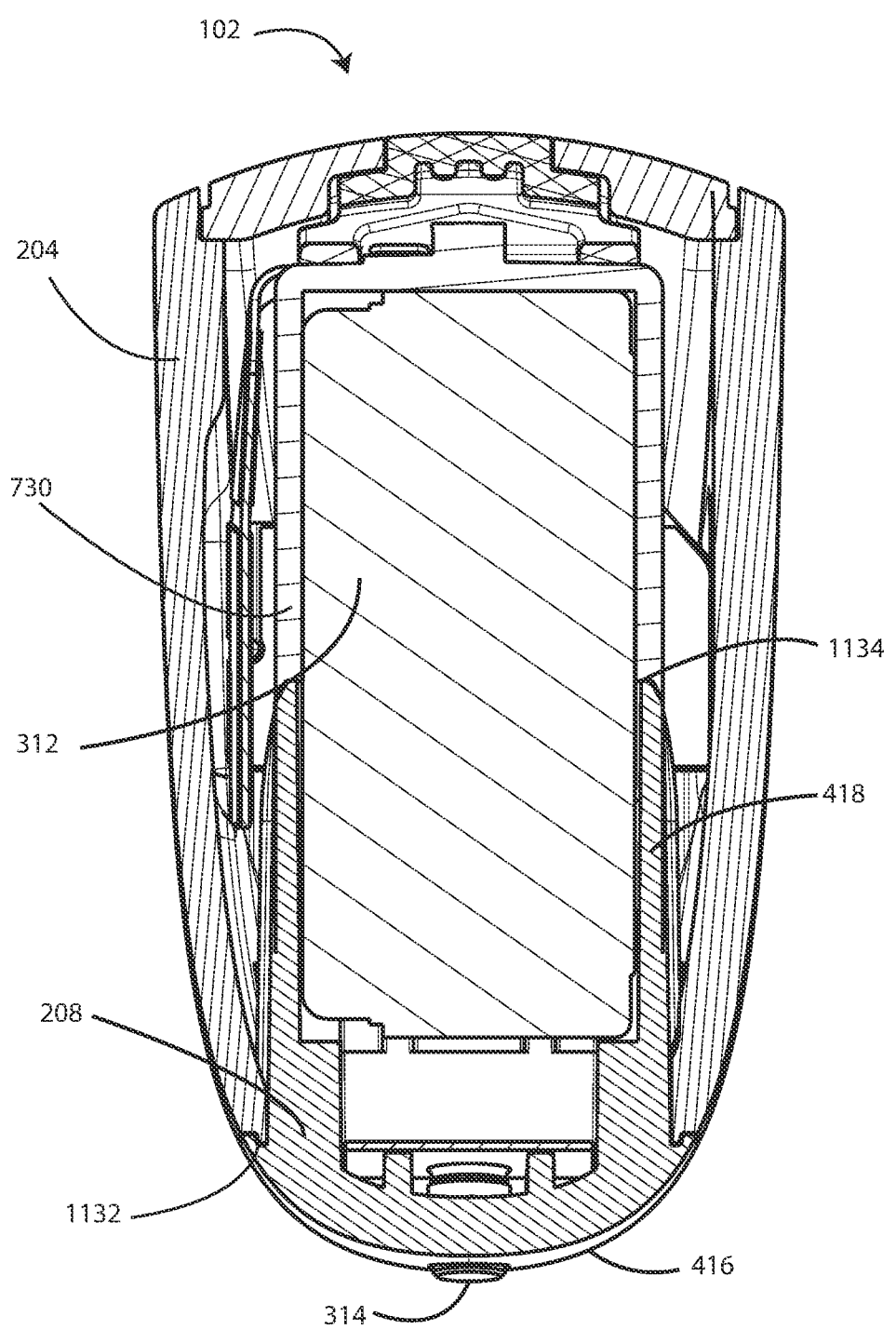
FIG. 11 is a cross-sectional view of the ear-worn device of FIG. 2 along line 11-11 in accordance with various embodiments herein.

Referring now to FIG. 11, a cross-sectional view of the ear-worn device of FIG. 2 is shown in accordance with various embodiments herein. In various embodiments, the first cartridge lap joint flange 424 is configured to interface with a first ear-worn device lap joint flange 628 on an ear-worn device housing 204 to form a first lap joint 1132. In various embodiments, the second cartridge lap joint flange 426 is configured to interface with a second ear-worn device lap joint flange 731 on an ear-worn device spine 730 to form a second lap joint 1134.

The first lap joint 1132 and second lap joint 1134 can be any suitable type of lap joint, such as a half lap joint. In various embodiments, the first lap joint 1132 forms a seal between the cartridge housing 416 and the ear-worn device housing 204 and the second lap joint 1134 forms a seal between the battery shroud 418 and the ear-worn device spine 730. The combined seals of the first lap joint 1132 and the second lap joint 1134 are configured to encase the rechargeable battery between the cartridge housing 416, the ear-worn device housing 204, and the ear-worn device spine 730 such that the rechargeable battery 312 and other cartridge electrical components are sealed off from the ambient environment.

Charger Case

Figure 12:
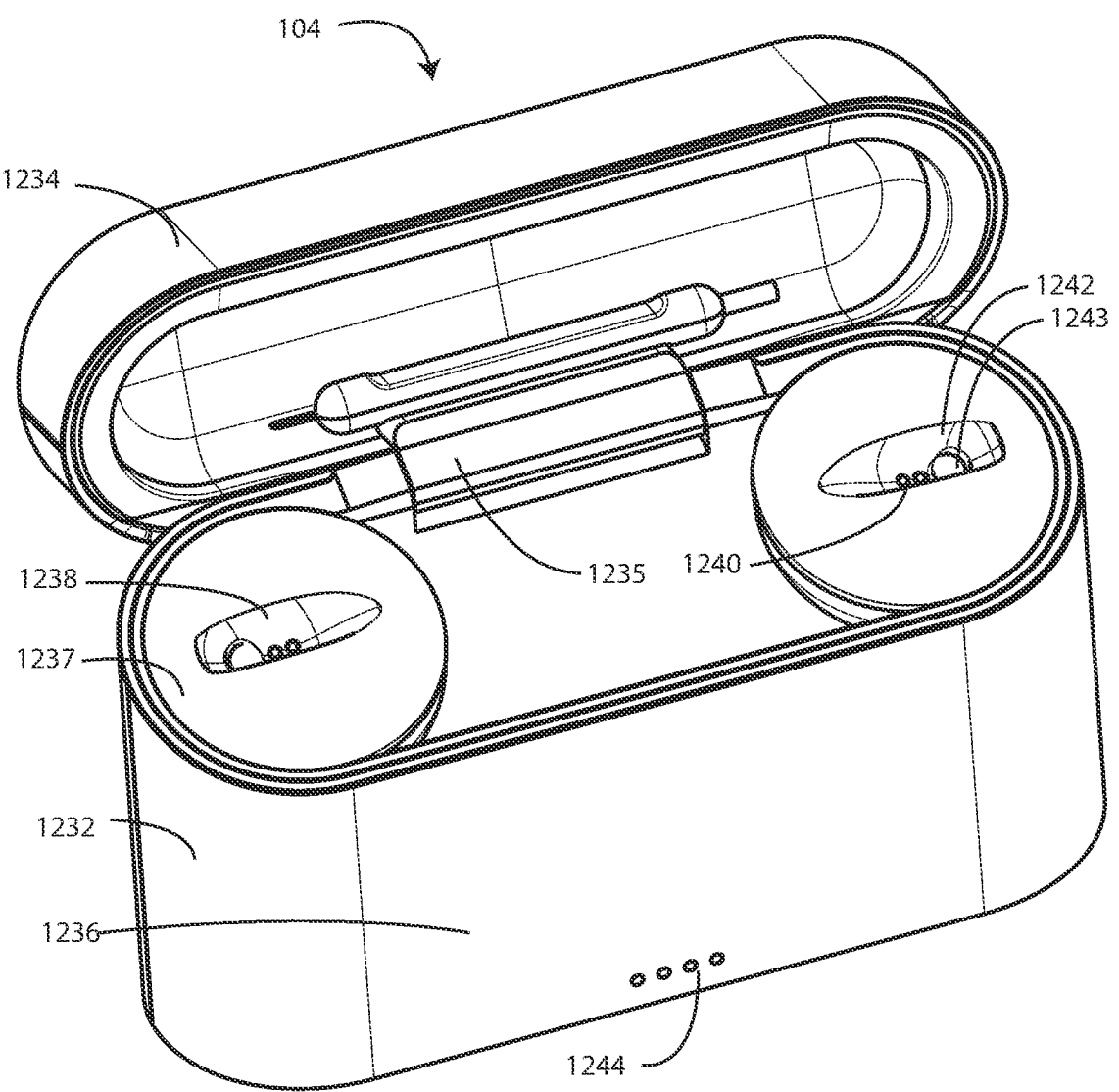
FIG. 12 is a perspective view of a charger case in accordance with various embodiments herein.

Referring now to FIG. 12, a perspective view of a charger case is shown in accordance with various embodiments herein. Embodiments of the charger case 104 are directed to storing, protecting, and charging ear-worn device(s) 102 and/or cartridge(s) 208 contained within the charger case. In various embodiments, the charger case 104 may be configured to move between an open position and a closed position. The case may be sized to be easily held in a human hand, easily held in a typical pocket of clothing, and easily transported. As a result of the ease of transportation, a user is more likely to bring the case along with the user when away from home or even within the home. A safe place for storing the ear-worn devices and the ability to charge the hearing aids is therefore more likely to be close at hand to the user. In various embodiments, the case may be opened and closed with a single human hand.

In various embodiments, the charger case 104 can have a top surface 1237 and one or more indentations 1238 defined in the top surface configured to receive an ear-worn device 102 or a cartridge 208 and provide power to the rechargeable battery 312. In various embodiments, each indentation 1238 is shaped to be a negative of the cartridge housing outer panel 417, such that the cartridge housing sits flush with the indentation when placed in the charger case 104. Each indentation includes a case charging structure 1240 configured to charge a cartridge charging structure 314. In the embodiment of FIG. 12, the charger case 104 has two indentations 1238 configured to accommodate two ear-worn devices 102 and/or cartridges 208 at a given time. However, a charger case 104 can include any suitable number of indentations to accommodate the devices of a hearing assistance system 100, such as a single indentation or three or more indentations.

The case can further include a case alignment mechanism 1242 configured to align the cartridge charging assembly 420 to the case charging structure 1240. The alignment mechanism can include one or more receiving structures formed by the indentations 1238. Each receiving structure is shaped such that that the cartridge can only be inserted into the case in an orientation that enables the cartridge charging assembly 420 to charge the case charging structure 1240. Alternatively, or in addition, the case alignment mechanism 1242 can include a magnetic alignment structure such as a case magnet 1243 or metal portions that interact with a cartridge magnet 320 or metal feature on the cartridge. The magnetic alignment structure pulls the cartridge into and secures the cartridge in an orientation where it will be charged by the case.

In some embodiments, the cartridge 208 can include cartridge magnet 320 and the charger case 104 can include a case magnet 1243. In alternative embodiments, the cartridge 208 can include cartridge magnet 320 and the charger case 104 can include a metallic material configured to attract the cartridge magnet or the charger case can include a charger case magnet 1243 and the charger can include a metallic material configured to attract the charger case magnet 1243.

The case can have a case main body 1232 and a lid 1234. The case main body 1232 may further include a case battery and case electronics 1236 configured to charge one or more ear-worn devices and/or cartridges among other optional functions. The case main body 1232 may be connected to the lid 1234 by a hinge 1235 such that the lid can move the case between an open and closed position.

In various examples, the charger case 104 may be configured or adapted such that the ear-worn devices 102 and/or cartridges 208 contained within the charger case are charging when the case is in a closed position, and, for example, not charging when the case is in the open position. Specifically, the case may include one or more contact points that interact with one another when the case is in the closed position to charge the ear-worn devices. As such, a user knows that the ear-worn devices contained within the case are charging when the case is in a closed position. In one or more embodiments, the case may also be configured or adapted such that the ear-worn devices contained within the case may charge when the case is in the open position In various embodiments, the charger case 104 may include case display 1244 to provide a visual indicator regarding the status of components within the charger case 104. In an exemplary embodiment, the display can include one or more LEDS. For example, the case display 1244 may communicate the power level/status of the ear-worn devices or the battery 312 contained within the charger case 104. The case display 1244 may be located anywhere on the charger case 104, such as the case main body 1232 or the lid 1234.

Figure 13:
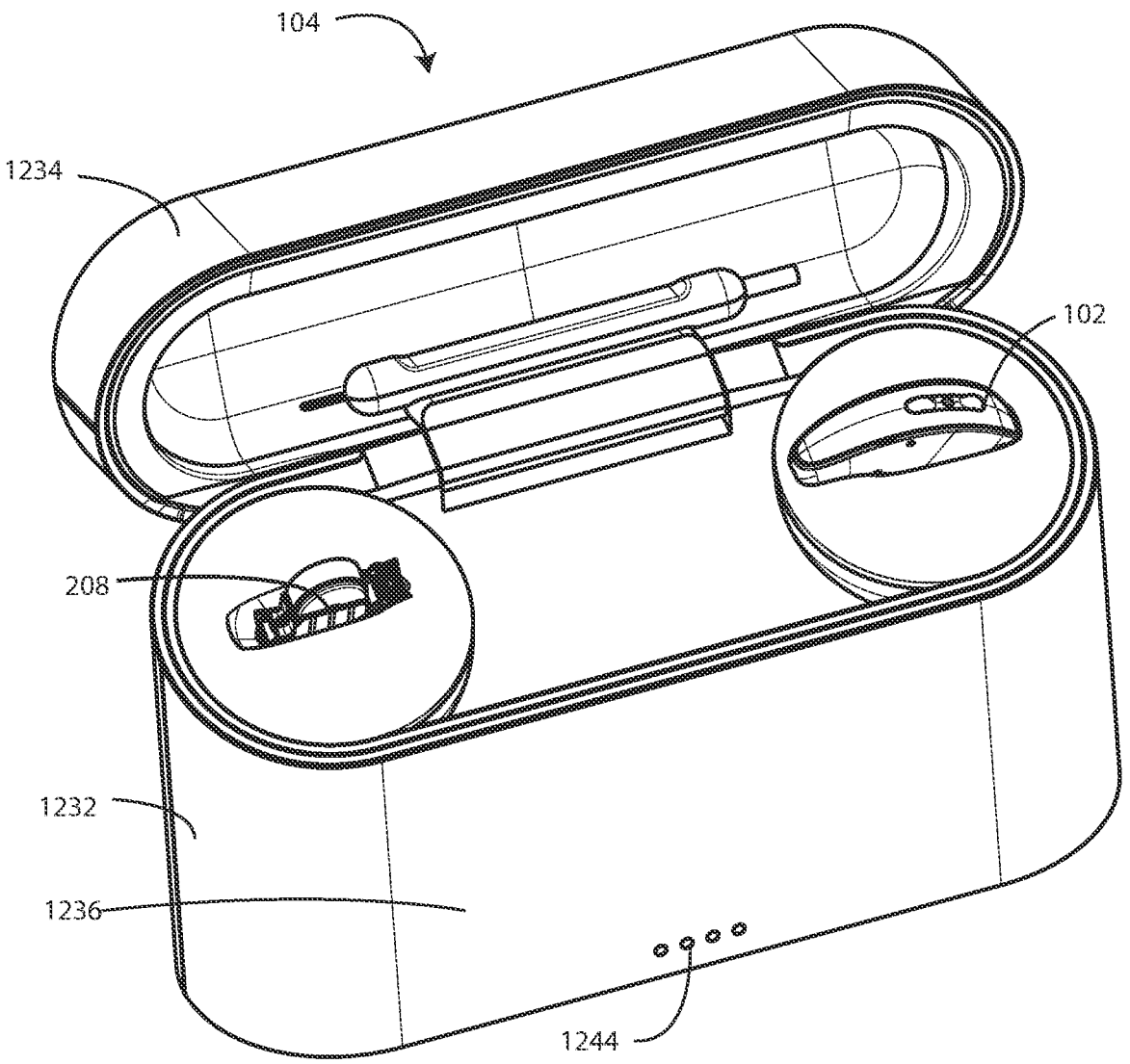
FIG. 13 is a perspective view of a charger case shown in accordance with various embodiments herein in accordance with various embodiments herein.

Referring now to FIG. 13, a perspective view of a charger case is shown in accordance with various embodiments herein. The example of FIG. 13 depicts a charger case 104 charging a rechargeable battery 312 of a stand-alone cartridge 208 in a first indentation 1238 and a cartridge housed in an ear-worn device 102 in a second indentation. As detailed above, each indentation 1238 includes a case charging structure 1240 configured to electrically connect with a cartridge charging structure 314 and supply power to the rechargeable battery 312 of the cartridge 208. Each indentation 1238 is configured to accommodate either a stand-alone cartridges 208 or an entire ear-worn devices 102 including a cartridge 208. Such a configuration is advantageous because upon depleting the rechargeable battery 312, cartridge 208 can be removed from the ear-worn device 102 and placed in the charger case 104 to recharge the rechargeable battery. Alternatively, the cartridge 208 can be kept in the ear-worn device 102 and the entire ear-worn device can be placed in charger case 104 recharge the rechargeable battery. Having a second cartridge 208 or additional cartridges 208 is especially advantageous because user can replace the depleted original cartridge 208 with a second cartridge having a fully charged or partially charged rechargeable battery 312.

Figure 14:
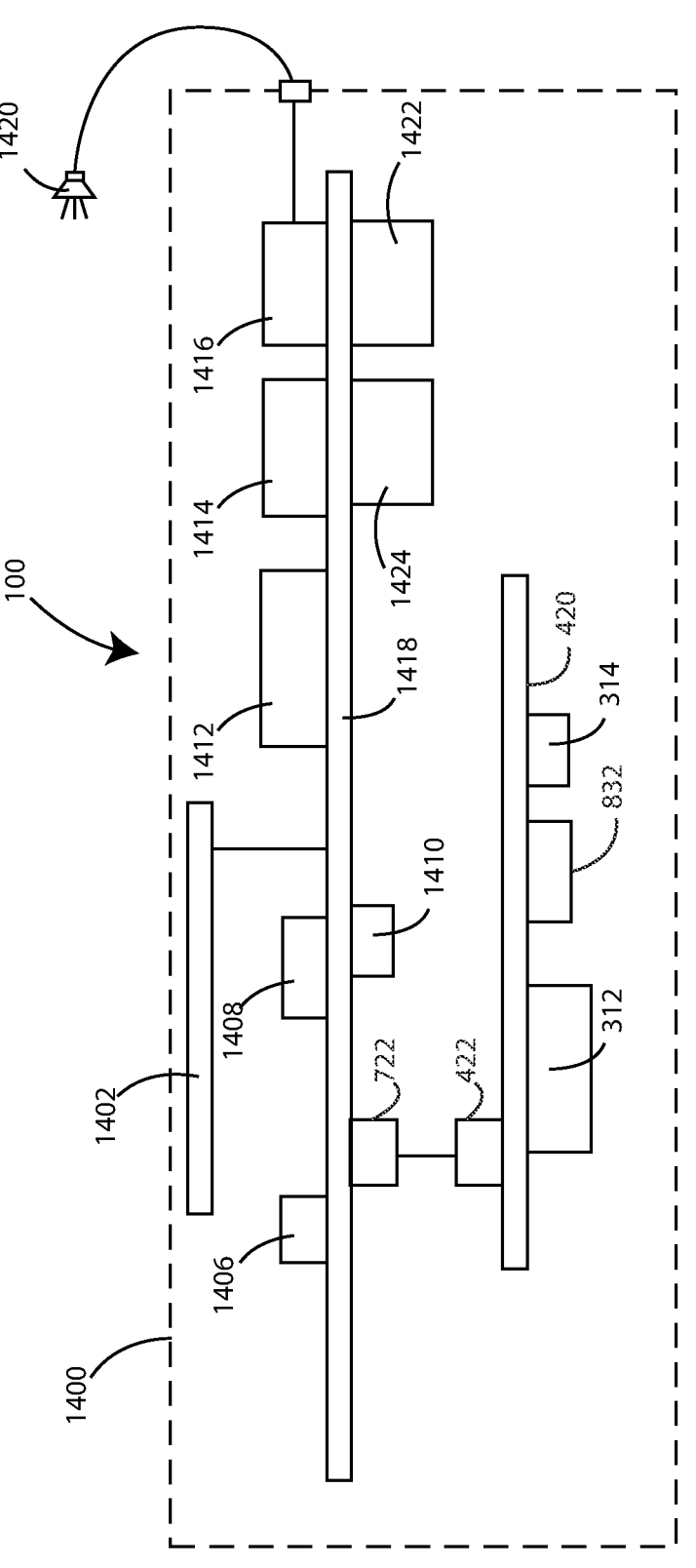
FIG. 14 is a schematic block diagram shown with various components of an ear-worn device in accordance with various embodiments herein.

Referring now to FIG. 14, a schematic block diagram is shown with various components of an ear-worn device in accordance with various embodiments. The block diagram of FIG. 14 represents a generic ear-worn device for purposes of illustration. The ear-worn device 1400 shown in FIG. 14 includes several components electrically connected to a flexible mother circuit 1418 (e.g., flexible mother board) which is disposed within the ear-worn device housing 204.

The flexible mother circuit 1418 of the ear-worn device 102 may be electrically connected to a circuit board of a charging assembly 420 of a cartridge 208. In one example, an ear-worn device connector 722 is electrically connected to the flexible mother circuit 1418. The ear-worn device connector 722 is configured to connect to a cartridge connector which is electrically connected to the circuit board of the charging assembly 420. In various embodiments, a power management module 832 and a rechargeable battery 312, can be electrically connected to a flexible circuit board 831 disposed on the charging assembly 420, and are configured to provide power to the various components of the ear-worn device 102. A cartridge charging structure 314 is electrically connected to the rechargeable battery 312 on the charging assembly 420 and is configured to interface with a charging structure of a charger case 104.

One or more microphones 1406 are electrically connected to the flexible mother circuit 1418, which provides electrical communication between the microphones 1406 and a digital signal processor (DSP) 1412. Among other components, the DSP 1412 incorporates or is coupled to audio signal processing circuitry configured to implement various functions described herein. One or more user switches 1410 (e.g., on/off, volume, mic directional settings) are electrically coupled to the DSP 1412 via the flexible mother circuit 1418.

A sensor package 1414 can be coupled to the DSP 1412 via the flexible mother circuit 1418. The sensor package 1414 can include one or more different specific types of sensors. The ear-worn device includes an ear-worn device IMU. The IMU is configured to detect a vibration sequence as a part of a pairing method for the wireless communication device 1408, among other useful data that can be ascertained from IMU.

As used herein the term "inertial measurement unit" or "IMU" shall refer to an electronic device that can generate signals related to a body's specific force and/or angular rate. IMUs herein can include one or more accelerometers (3, 6, or 9 axis) to detect linear acceleration, a gyroscope to detect rotational rate, or both. In some embodiments, in the alternative or in addition, an IMU includes a magnetometer to detect a magnetic field.

An audio output device 1416 is electrically connected to the DSP 1412 via the flexible mother circuit 1418. In some embodiments, the audio output device 1416 comprises a speaker (coupled to an amplifier). In other embodiments, the audio output device 1416 comprises an amplifier coupled to an external receiver 1420 adapted for positioning within an ear of a wearer. The external receiver 1420 can include an electroacoustic transducer, speaker, or loudspeaker.

The ear-worn device 102 may incorporate a wireless communication device 1408 coupled to the flexible mother circuit 1418 and to an antenna 1402 directly or indirectly via the flexible mother circuit 1418. The communication device 1408 can be a Bluetooth® transceiver, such as a BLE (Bluetooth® low energy) transceiver or another transceiver (e.g., an IEEE 802.11 compliant device). The communication device 1408 can be configured to communicate with one or more external devices, such as a wireless communication device of a charger case, a wireless communication device of another ear-worn device, a wireless communication device of a smart phone, or a wireless communication device of another system, such as other systems discussed herein, in accordance with various embodiments. In various embodiments, the communication device 1408 can be configured to communicate with an external visual display device such as a smart phone, a video display screen, a tablet, a computer, or the like.

In various embodiments, the ear-worn device 102 can also include a control circuit 1422 and a memory storage device 1424. The control circuit 1422 can be in electrical communication with other components of the device. The control circuit 1422 can execute various operations, such as those described herein. The control circuit 1422 can include various components including, but not limited to, a microprocessor, a microcontroller, an FPGA (field-programmable gate array) processing device, an ASIC (application specific integrated circuit), or the like. The memory storage device 1424 can include both volatile and non-volatile memory. The memory storage device 1424 can include ROM, RAM, flash memory, EEPROM, SSD devices, NAND chips, and the like. The memory storage device 1424 can be used to store data from sensors as described herein and/or processed data generated using data from sensors as described herein, including, but not limited to, information regarding exercise regimens, performance of the same, visual feedback regarding exercises, and the like.

It is noted that the structure and housing of a second ear-worn device is not illustrated herein but may be similar to or identical to the first ear-worn device.

Figure 15:
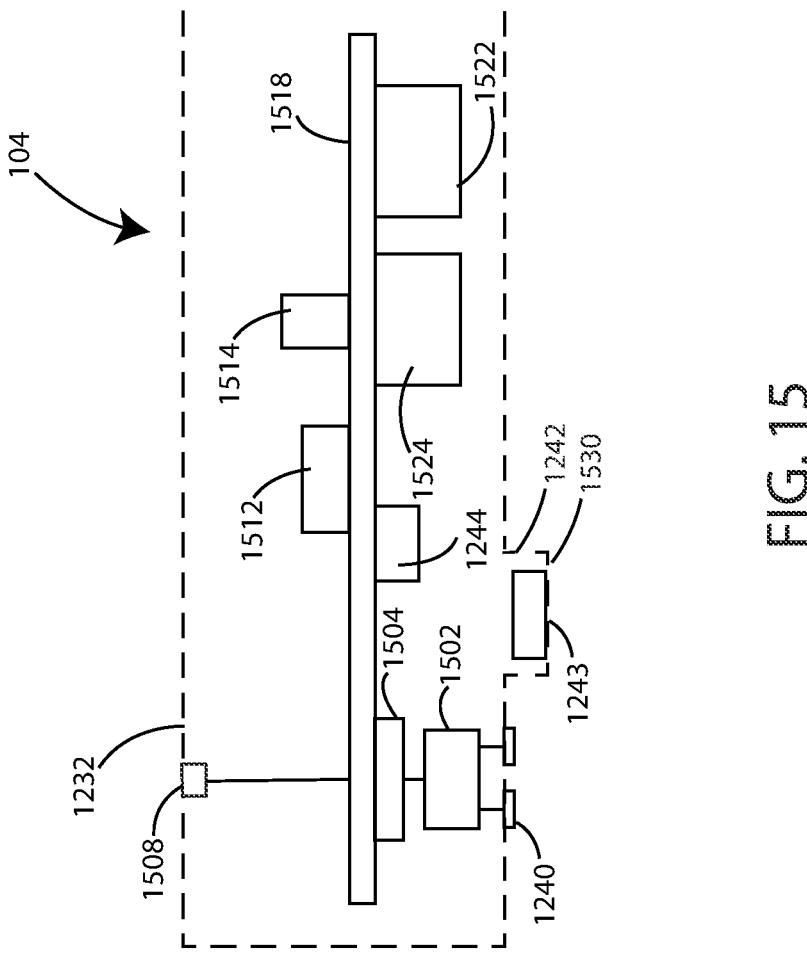
FIG. 15 is a schematic block diagram shown with various components of a charger case in accordance with various embodiments herein.
Figure 16:
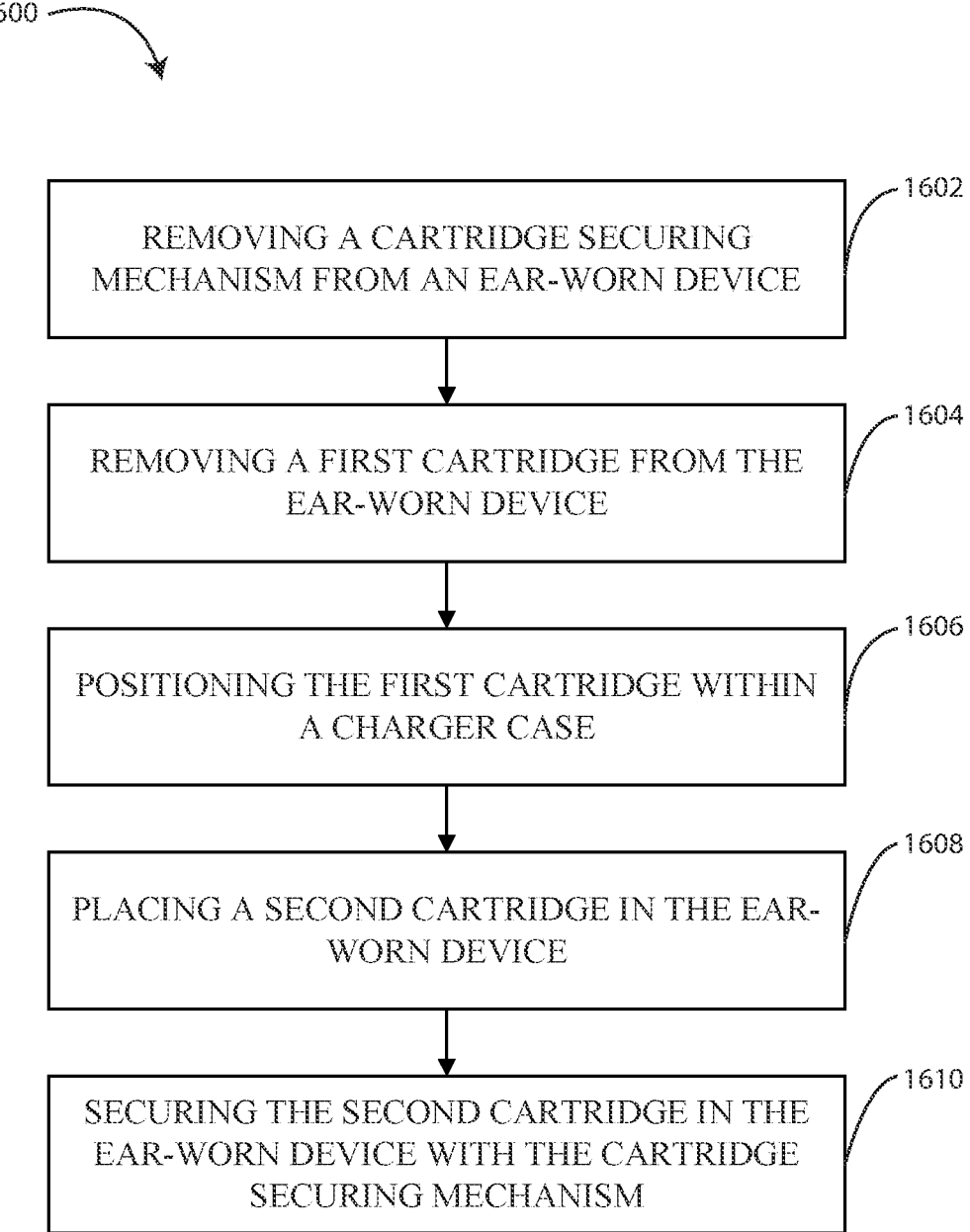
FIG. 16 is a flow chart of method of replacing a rechargeable battery in a hearing assistance system in accordance with various embodiments herein.

FIG. 15 is a schematic view of one embodiment of a charger case. In various embodiments, the charger case 104 includes a case battery 1502, a case processor 1512, a case sensor package 1514, a case control circuit 1522, and a case non-transitory computer memory 1524, which are each can be connected to a circuit board 1518. The charger case 104 also includes a case main body 1232. The charger case 104 also includes a power supply circuit 1504 connected to a case charging structure 1240 and the case battery 1502. The charger case 104 also includes case display 1244 and an interface port 1508.

The charger case 104 can include a case alignment mechanism 1242 configured to align with a cartridge alignment mechanism in the cartridge (such as magnet 320). The case alignment mechanism 1242 can be a mechanically-mating structure, such as a protrusion 1530 that mates with a depression on the cartridge. Alternatively, or in addition, the case alignment mechanism 1242 can include a magnet 1243 or metal portion that interacts with a magnet or metal feature on the cartridge.

Methods

In an embodiment, a method 1600 of replacing a rechargeable battery in a hearing assistance system is included. The method 1600 can include the step 1602 of removing a cartridge securing mechanism from an ear-worn device. In an embodiment, the cartridge securing mechanism can include one or more cross pins and the step 1602 of removing a cartridge securing mechanism from an ear-worn device can include pulling the one or more cross pins out of the ear-worn device. The step of pulling one or more cross pins out of the ear-worn device can be performed with a pin release tool. In an embodiment, the cartridge securing mechanism can include a friction fit or a snap fit between the ear-worn device housing and the cartridge and the step 1602 of removing a cartridge securing mechanism from an ear-worn device can include pulling the ear-worn device from the cartridge to disengage the friction fit.

The method 1600 can include the step 1604 of removing a first cartridge from the ear-worn device. In various embodiments, the first cartridge can have a rechargeable battery and a first cartridge charging structure. In various embodiments, step 1604 of removing a first cartridge from the ear-worn device can include pulling the first cartridge out from the bottom of the ear-worn device housing. In various embodiments, the cartridge can be manually removed from the ear-worn device using only the hands of a user and without the use of tools. Alternatively, the cartridge may be removed from the ear-worn device using one or more instruments.

The method 1600 can include the step 1606 of positioning the first cartridge within a charger case such that the first cartridge charging structure is adjacent to a first case charging structure within the charger case. In various embodiments, step 1606 includes positioning the first cartridge within the charger case so a cartridge charging structure of the first cartridge is adjacent to a case charging structure within the charger case. In some embodiments, the cartridge and the charger case each have alignment mechanisms configured to automatically align the cartridge charging structure to the charger case charging structure.

The method 1600 can include the step 1608 of placing a second cartridge in the ear-worn device. In various embodiments, the second cartridge can have rechargeable battery and a second cartridge charging structure. If the rechargeable battery of the second cartridge is fully charged or at least partially charged, it can be used immediately to power the ear-worn device. In various embodiments, step 1608 can include inserting the second cartridge into the bottom of the ear-worn device housing. In various embodiments, the cartridge can be manually inserted into the ear-worn device using only the hands of a user and without the use of tools. Alternatively, the cartridge may be inserted to the ear-worn device using one or more instruments.

The method 1600 can include the step 1610 of securing the second cartridge in the ear-worn device with the cartridge securing mechanism. In an embodiment, the cartridge securing mechanism can include one or more cross pins and the step 1610 can include inserting the one or more cross pins into the ear-worn device. In an embodiment, the cartridge securing mechanism can include a friction fit or a snap fit between the ear-worn device housing and the cartridge and the step 1602 of inserting a cartridge securing mechanism into an ear-worn device can include pressing the ear-worn device to the cartridge to engage the friction fit.

Many different methods are contemplated herein, including, but not limited to, methods of making, methods of using, and the like. Aspects of system/device operation described elsewhere herein can be performed as operations of one or more methods in accordance with various embodiments herein.

In various embodiments, operations described herein, and method steps can be performed as part of a computer-implemented method executed by one or more processors of one or more computing devices. In various embodiments, operations described herein, and method steps can be implemented instructions stored on a non-transitory, computer-readable medium that, when executed by one or more processors, cause a system to execute the operations and/or steps.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A hearing assistance system comprising:
a first ear-worn device comprising a speaker, a microphone, a processor, a non-transitory computer memory, an ear-worn device housing defining a cartridge opening, wherein the cartridge opening forms a cavity within the ear-worn device housing; a first cartridge, the first cartridge comprising:
a cartridge housing having an inner surface and an outer surface;
a first charging assembly configured to sit on the inner surface of the cartridge housing, the first charging assembly comprising:
a circuit board,
a rechargeable battery,
one or more battery tabs, wherein the one or more battery tabs electrically connect the rechargeable battery to the circuit board;
a cartridge connector electrically connected to the circuit board, wherein the cartridge connector is configured to electrically connect the first charging assembly to an ear-worn device connector of the ear-worn device;
a first cartridge charging structure, wherein the first cartridge charging structure is electrically connected to the circuit board, the first cartridge charging structure comprising a first contact portion configured to extend through the cartridge housing to an outer surface of the cartridge;
wherein the first cartridge is removably insertable into the first ear-worn device such that when the first cartridge is inserted into the ear-worn device:
the first cartridge is disposed within the cartridge opening such that the outer surface of the cartridge housing sits flush with the ear-worn device housing and the inner surface of the cartridge housing is disposed within the cavity;
the circuit board and the rechargeable battery are disposed within the cavity; and
a charger case comprising a first case charging structure;
wherein the first ear-worn device is configured to be positioned within the charger case so that the first contact portion on the outer surface of the first cartridge is in electrical contact with the first case charging structure within the charger case; and
wherein the first cartridge is configured to be removed from the first ear-worn device and positioned within the charger case so that the first contact portion on the outer surface of the first cartridge is in electrical contact with the first case charging structure within the charger case.

2. The hearing assistance system of claim 1, the first ear-worn device comprising a cartridge securing mechanism, wherein the first cartridge is removable from the first ear-worn device upon removal of the cartridge securing mechanism from the first ear-worn device, the cartridge securing mechanism comprising a cross pin configured to extend through an aperture in the ear-worn device.

3. The hearing assistance system of claim 1, further comprising a second cartridge, the second cartridge comprising a second rechargeable battery and a second cartridge charging structure, wherein the second cartridge is configured to replace the first cartridge in the first ear-worn device.

4. The hearing assistance system of claim 1, the first cartridge comprising a power management module, wherein the power management module is located on the inner surface of the cartridge housing.

5. The hearing assistance system of claim 1, the cartridge housing defining a cartridge housing perimeter, the cartridge opening having a cartridge opening perimeter configured to receive the first cartridge and mate with the cartridge housing perimeter upon the first cartridge being positioned in the first ear-worn device, wherein the cartridge housing comprises:
a. an outer panel comprising the outer surface of the cartridge housing, the inner surface of the cartridge housing, and the cartridge housing perimeter; and
b. a battery shroud attached to the inner surface of the outer panel and extending around portions of the rechargeable battery, the battery shroud comprising a top battery shroud perimeter.

6. The hearing assistance system of claim 5, the first cartridge comprising a first cartridge lap joint flange surrounding the outer panel perimeter and a second cartridge lap joint flange surrounding the battery shroud perimeter.

7. The hearing assistance system of claim 6, wherein the first cartridge lap joint flange is configured to interface with a first ear-worn device lap joint flange on an ear-worn device housing to form a first lap joint, and the second cartridge lap joint flange is configured to interface with a second ear-worn device lap joint flange on an ear-worn device spine to form a second lap joint.

8. The hearing assistance system of claim 5, the battery shroud further comprising a plurality of ribs configured to align the first cartridge to a spine of the ear-worn device, wherein the battery shroud is configured to completely cover the rechargeable battery such that the rechargeable battery is encased by the cartridge housing and the battery shroud.

9. The hearing assistance system of claim 1, wherein the first cartridge charging structure comprises a cartridge charging contact pair and the first case charging structure comprises a case charging contact pair, wherein the first cartridge is configured to be positioned within the charger case so that the first cartridge charging contact pair is in electrical communication with the first case charging contact pair within the charger case, wherein the first contact portion on the outer surface of the first cartridge is part of the cartridge charging contact pair.

10. The hearing assistance system of claim 9, the first cartridge comprising a cartridge alignment mechanism and the charger case comprising a charger case alignment mechanism, wherein the cartridge alignment mechanism is configured to align the first cartridge charging contact pair to the first case charging contact pair within the charger case, wherein the cartridge alignment mechanism comprises a cartridge magnet and the charger case alignment mechanism comprises a charger case magnet.

11. The hearing assistance system of claim 5, wherein the cartridge connector is disposed on the inner surface of the cartridge housing at a first end of the outer panel and, wherein the cartridge connector is configured to removably connect to the ear-worn device connector within the cartridge opening.

12. The hearing assistance system of claim 1, further comprising hydrophobic coating covering the rechargeable battery.

13. The hearing assistance system of claim 1, wherein the rechargeable battery is removable from the first cartridge and configured to be replaced with a second rechargeable battery.

14. A hearing assistance system comprising:

a first ear-worn device comprising a speaker, a microphone, a processor, a non-transitory computer memory, an ear-worn device housing defining a cartridge opening, wherein the cartridge opening forms a cavity within the ear-worn device housing, and a first cartridge, the first cartridge comprising:

a first cartridge housing having an inner surface and an outer surface;

a first charging assembly configured to sit on the inner surface of the cartridge housing, the first charging assembly comprising:

a circuit board;

a rechargeable battery;

one or more battery tabs, wherein the one or more battery tabs electrically connect the rechargeable battery to the circuit board;

a cartridge connector electrically connected to the circuit board, wherein the cartridge connector is configured to electrically connect the first charging assembly to an ear-worn device connector of the ear-worn device;

a first cartridge charging structure, wherein the first cartridge charging structure is electrically connected to the circuit board, the first cartridge charging structure comprising a first contact portion configured to extend through the cartridge housing to an outer surface of the cartridge;

wherein the first cartridge is removably insertable into the first ear-worn device such that when the first cartridge is inserted into the ear-worn device:

the first cartridge is disposed within the first cartridge opening such that an outer surface of the cartridge housing sits flush with the ear-worn device housing and the inner surface of the cartridge housing is disposed within the cavity;

the circuit board and the rechargeable battery are disposed within the cavity.

15. The hearing assistance system of claim 14, further comprising a charger case comprising a first case charging structure;

wherein the first ear-worn device is configured to be positioned within the charger case so that the first contact portion on the outer surface of the first cartridge is in electrical contact with the first case charging structure within the charger case, wherein the first cartridge is configured to be removed from the first ear-worn device and positioned within the charger case so that the first cartridge charging structure is adjacent to the first case charging structure within the charger case.

16. The hearing assistance system of claim 15, further comprising a second cartridge comprising a second rechargeable battery and a second cartridge charging structure;

wherein the second cartridge is configured to replace the first cartridge in the first ear-worn device; and wherein the second cartridge is configured to be removed from the first ear-worn device and positioned within the charger case so that the second cartridge charging structure is adjacent to the first case charging structure within the charger case.

17. The hearing assistance system of claim 16, wherein the charger case comprises a case magnetic alignment structure, the first cartridge further comprises a first magnetic alignment structure, and wherein the case magnetic alignment structure pulls the first cartridge into a charging orientation in the charger case.

18. A method of replacing a rechargeable battery in a hearing assistance system, comprising:

removing a cartridge securing mechanism from an ear-worn device, wherein the ear-worn device comprises an ear-worn device housing defining a cartridge opening, wherein the cartridge opening forms a cavity within the ear-worn device housing;

removing a first cartridge from the ear-worn device, the first cartridge comprising a cartridge housing having an inner surface and an outer surface; and a charging assembly configured to sit on the inner surface of the cartridge housing, the first charging assembly comprising:

a circuit board;

a rechargeable battery;

one or more battery tabs, wherein the one or more battery tabs electrically connect the rechargeable battery to the circuit board;

a cartridge connector electrically connected to the circuit board, wherein the cartridge connector is configured to electrically connect the charging assembly to an ear-worn device connector of the ear-worn device;

a first cartridge charging structure wherein the first cartridge charging structure is electrically connected to the circuit board, the first cartridge charging structure comprising a first contact portion configured to extend through the cartridge housing to an outer surface of the cartridge;

wherein the first cartridge is removably insertable into the first ear-worn device such that when the first cartridge is inserted into the ear-worn device:

the first cartridge is disposed within a cartridge opening of the ear-worn device such that an outer surface of the cartridge housing sits flush with an ear-worn device housing and the inner surface of the cartridge housing is disposed within the cavity;

the circuit board and the rechargeable battery are disposed within the cavity;

positioning the first cartridge within a charger case such that the first contact portion on the outer surface of the first cartridge is in electrical contact with a first case charging structure within the charger case;

placing a second cartridge in the ear-worn device; and securing the second cartridge in the ear-worn device with the cartridge securing mechanism.

19. The hearing assistance system of claim 1, the cartridge connector comprising any of a board to board connector, a pin and socket connector, a spring-loaded pin connector, and a spring contact connector.

\* \* \* \* \*